(12) United States Patent
Gomez et al.

(10) Patent No.: US 12,527,569 B1
(45) Date of Patent: Jan. 20, 2026

(54) MULTI-PORT CLOSURE DEVICE, CORRESPONDING SUTURE MATERIAL AND MESH, A METHOD FOR REPAIRING AND CLOSING A FASCIAL DEFECT, AND RELATED DEVICES AND METHODS

(71) Applicants: Ricardo Alexander Gomez, Lighthouse Point, FL (US); Theo David Dienes, Coconut Creek, FL (US); Luis David Suazo, Coconut Creek, FL (US)

(72) Inventors: Ricardo Alexander Gomez, Lighthouse Point, FL (US); Theo David Dienes, Coconut Creek, FL (US); Luis David Suazo, Coconut Creek, FL (US)

(73) Assignee: New Wave Endo—Surgical Corp., Cocnut Creek, FL (US)

( * ) Notice: Subject to any disclaimer, the term of this patent is extended or adjusted under 35 U.S.C. 154(b) by 795 days.

(21) Appl. No.: 17/344,938

(22) Filed: Jun. 10, 2021

Related U.S. Application Data

(60) Provisional application No. 63/036,996, filed on Jun. 10, 2020, provisional application No. 63/036,993, filed on Jun. 10, 2020.

(51) Int. Cl.
*A61B 17/04* (2006.01)
*A61B 17/00* (2006.01)

(52) U.S. Cl.
CPC ............... *A61B 17/0482* (2013.01); *A61B 2017/00637* (2013.01); *A61B 2017/00663* (2013.01); *A61B 17/0469* (2013.01); *A61B 17/0483* (2013.01)

(58) Field of Classification Search
CPC ............ A61B 17/0469; A61B 17/0482; A61B 17/0483; A61B 17/04; A61B 17/0491; A61B 2017/00663; A61B 2017/00637
(Continued)

(56) References Cited

U.S. PATENT DOCUMENTS

| 739,933 A | 9/1903 | Sieurin |
| 2,176,977 A | 10/1939 | Karl |

(Continued)

FOREIGN PATENT DOCUMENTS

| CN | 10574812 A | 7/2016 |
| CN | 108652711 A | 10/2018 |
| JP | 2005006868 A | 1/2005 |

*Primary Examiner* — Dianne Dornbusch
(74) *Attorney, Agent, or Firm* — Anthony Kandare; KandareIP, LLC

(57) ABSTRACT

A Multi-port Closure Device is provided for percutaneous insertion through a fascial port in a first arrangement and simultaneously providing a plurality of suture pathways extending longitudinally through the device and extending across a width and central region of the defect in a second arrangement for implementing suture bites about a defect perimeter in an equidistant orientation. The plurality of suture pathways can be arranged to retain barbs of a bi-directional suture material in an undeployed condition for traversing suture pathways without interference. Elongate gaps can be provided along suture pathways for releasing the suture material for readily engaging tissue in a matching arrangement on opposite sides of the defect. The bi-directional barbs can include visual guidance features and mesh connection features, and the device can include mechanisms for enhanced guidance and connection of suture material to mesh material for secure placement and retention of mesh and mitigating herniation.

3 Claims, 27 Drawing Sheets

(58) Field of Classification Search
USPC .............................. 606/144, 139, 148, 145
See application file for complete search history.

(56) References Cited

U.S. PATENT DOCUMENTS

| | | | |
|---|---|---|---|
| 4,634,042 A | 1/1987 | Smith | |
| 4,676,249 A | 6/1987 | Arenas et al. | |
| 4,895,168 A | 1/1990 | Machek | |
| 5,127,917 A | 7/1992 | Niederhauser et al. | |
| 5,197,484 A | 3/1993 | Kornberg et al. | |
| 5,199,310 A | 4/1993 | Yoshimura | |
| 5,368,601 A * | 11/1994 | Sauer .................. | A61B 17/062 606/139 |
| 5,407,432 A | 4/1995 | Solar | |
| 5,411,033 A | 5/1995 | Viera | |
| 5,415,170 A | 5/1995 | Hammerslag et al. | |
| 5,415,177 A | 5/1995 | Zadini et al. | |
| 5,417,699 A | 5/1995 | Klein et al. | |
| 5,443,078 A | 8/1995 | Uflacker | |
| 5,527,322 A | 6/1996 | Klein et al. | |
| 5,536,248 A | 7/1996 | Weaver et al. | |
| 5,549,119 A | 8/1996 | Solar | |
| 5,579,780 A | 12/1996 | Zadini et al. | |
| 5,697,907 A | 12/1997 | Gaba | |
| 5,749,371 A | 5/1998 | Zadini et al. | |
| 5,810,012 A | 9/1998 | Lynch et al. | |
| 5,843,091 A | 12/1998 | Holsinger et al. | |
| 5,957,865 A | 9/1999 | Backman et al. | |
| 5,971,963 A | 10/1999 | Choi | |
| 6,139,540 A | 10/2000 | Rost et al. | |
| 6,171,234 B1 | 1/2001 | White et al. | |
| 6,197,001 B1 | 3/2001 | Wilson et al. | |
| 6,589,157 B2 | 7/2003 | Fontayne et al. | |
| 6,669,669 B2 | 12/2003 | Flaherty et al. | |
| 6,743,241 B2 | 6/2004 | Kerr | |
| 6,855,109 B2 | 2/2005 | Obata et al. | |
| 6,878,136 B2 | 4/2005 | Fleury et al. | |
| 6,918,894 B2 | 7/2005 | Fleury et al. | |
| 6,972,027 B2 | 12/2005 | Fallin et al. | |
| 7,060,033 B2 | 6/2006 | White et al. | |
| 7,226,451 B2 | 6/2007 | Shluzas et al. | |
| 7,455,664 B2 | 11/2008 | Fleury et al. | |
| 7,550,001 B2 | 6/2009 | Dorn et al. | |
| 7,935,141 B2 | 5/2011 | Randall et al. | |
| 8,029,513 B2 | 10/2011 | Konno et al. | |
| 8,062,312 B2 | 11/2011 | Gellman et al. | |
| 8,118,061 B2 | 2/2012 | Hyun et al. | |
| 8,128,644 B2 | 3/2012 | Carley et al. | |
| 8,317,761 B2 | 11/2012 | Birk et al. | |
| 8,439,050 B2 | 5/2013 | Tiphonnet | |
| 8,579,913 B2 | 11/2013 | Nielsen | |
| 8,579,922 B2 | 11/2013 | Glick et al. | |
| 8,636,760 B2 | 1/2014 | Garcia et al. | |
| 8,663,167 B2 | 3/2014 | Bartha | |
| 8,672,953 B2 | 3/2014 | Reyes et al. | |
| 8,764,683 B2 | 7/2014 | Meller et al. | |
| 8,764,734 B2 | 7/2014 | Gobron et al. | |
| 8,876,766 B2 | 11/2014 | Holmqvist et al. | |
| 8,888,834 B2 | 11/2014 | Hansen et al. | |
| 8,926,640 B2 | 1/2015 | Sauer et al. | |
| 8,961,435 B2 | 2/2015 | DeMello | |
| 8,961,560 B2 | 2/2015 | Avelar et al. | |
| 8,986,363 B2 | 3/2015 | McHugo et al. | |
| 8,992,487 B2 | 3/2015 | Eich et al. | |
| 9,039,750 B2 | 5/2015 | Ryan | |
| 9,061,097 B2 | 6/2015 | Holt et al. | |
| 9,119,942 B1 | 9/2015 | Rollins et al. | |
| 9,138,543 B2 | 9/2015 | Frantz et al. | |
| 9,149,272 B2 | 10/2015 | Sherts et al. | |
| 9,162,037 B2 | 10/2015 | Belson et al. | |
| 9,180,244 B2 | 11/2015 | Anderson et al. | |
| 9,351,722 B2 | 5/2016 | Koogle, Jr. et al. | |
| 9,364,228 B2 | 6/2016 | Straehnz et al. | |
| 9,408,742 B2 | 8/2016 | Dineen et al. | |
| 9,451,950 B2 | 9/2016 | Patel et al. | |
| 9,603,595 B2 | 3/2017 | Shelton, IV et al. | |
| 9,610,185 B2 | 4/2017 | Capra et al. | |
| 9,623,209 B2 | 4/2017 | Wenderow et al. | |
| 9,707,327 B2 | 7/2017 | Heilman et al. | |
| 9,822,551 B2 | 11/2017 | Ac et al. | |
| 9,895,146 B1 | 2/2018 | Al-Jazaeri | |
| 9,955,997 B2 | 5/2018 | Weisbrod et al. | |
| 9,956,382 B2 | 5/2018 | Hwang | |
| 9,986,987 B2 | 6/2018 | Patel et al. | |
| 9,999,443 B2 | 6/2018 | Heck et al. | |
| 10,010,681 B2 | 7/2018 | Koch et al. | |
| 10,098,618 B2 | 10/2018 | Thompson et al. | |
| 10,143,826 B2 | 12/2018 | Castro et al. | |
| 10,194,902 B2 | 2/2019 | Nobles et al. | |
| 10,251,995 B2 | 4/2019 | Giambattista et al. | |
| 10,258,324 B2 | 4/2019 | Prior et al. | |
| 10,279,118 B2 | 5/2019 | Oakley et al. | |
| 10,299,781 B2 | 5/2019 | McGhie | |
| 10,327,927 B2 | 6/2019 | Ryan et al. | |
| 10,376,637 B2 | 8/2019 | Gyrn et al. | |
| 10,413,313 B2 | 9/2019 | Brown et al. | |
| 10,448,939 B2 | 10/2019 | Sherwinter | |
| 10,507,307 B2 | 12/2019 | Gottlieb et al. | |
| 10,518,029 B2 | 12/2019 | Giambattista et al. | |
| 10,525,236 B2 | 1/2020 | Belson | |
| 10,537,312 B2 | 1/2020 | Voss | |
| 10,561,894 B2 | 2/2020 | Dalebout et al. | |
| 10,588,622 B2 | 3/2020 | Cardinale et al. | |
| 10,588,767 B2 | 3/2020 | Kaspar | |
| 10,603,435 B2 | 3/2020 | Marsh et al. | |
| 10,625,018 B2 | 4/2020 | Destefano et al. | |
| 10,869,690 B2 | 12/2020 | Parihar et al. | |
| 2005/0004601 A1 | 1/2005 | Kong et al. | |
| 2009/0209804 A1 | 8/2009 | Seiler et al. | |
| 2011/0082484 A1 | 4/2011 | Saravia et al. | |
| 2011/0106126 A1 | 5/2011 | Love et al. | |
| 2011/0264138 A1 | 10/2011 | Avelar et al. | |
| 2011/0288533 A1 | 11/2011 | Koch et al. | |
| 2012/0078231 A1 | 3/2012 | Hoshinouchi | |
| 2013/0012964 A1 | 1/2013 | Warnock | |
| 2014/0114291 A1 | 4/2014 | Defossez et al. | |
| 2014/0309686 A1 | 10/2014 | Ginn et al. | |
| 2015/0009474 A1 | 1/2015 | Thibos et al. | |
| 2015/0038989 A1 * | 2/2015 | Prior ...................... | A61B 17/08 606/144 |
| 2016/0038677 A1 | 2/2016 | Kiilerich | |
| 2016/0051765 A1 | 2/2016 | Morris et al. | |
| 2016/0058949 A1 | 3/2016 | Bayer et al. | |
| 2016/0151579 A1 | 6/2016 | Oakley et al. | |
| 2016/0199206 A1 | 7/2016 | Lim et al. | |
| 2016/0375223 A1 | 12/2016 | Avneri et al. | |
| 2017/0115734 A1 | 4/2017 | Shimotani et al. | |
| 2017/0189061 A1 | 7/2017 | Weisbrod et al. | |
| 2017/0258507 A1 | 9/2017 | Hetherington | |
| 2017/0296753 A1 | 10/2017 | Rowe et al. | |
| 2017/0348019 A1 | 12/2017 | Nakano et al. | |
| 2018/0056044 A1 | 3/2018 | Choi et al. | |
| 2018/0116689 A1 | 5/2018 | Nakano | |
| 2018/0193606 A1 | 7/2018 | Patel et al. | |
| 2018/0368774 A1 | 12/2018 | Gray et al. | |
| 2019/0000506 A1 | 1/2019 | Parihar et al. | |
| 2019/0015646 A1 | 1/2019 | Matlock et al. | |
| 2019/0027905 A1 | 1/2019 | Sweeney | |
| 2019/0038270 A1 | 2/2019 | Thompson et al. | |
| 2019/0038301 A1 | 2/2019 | Algawi et al. | |
| 2019/0069759 A1 | 3/2019 | Govari et al. | |
| 2019/0076280 A1 | 3/2019 | Halbert et al. | |
| 2019/0247050 A1 | 8/2019 | Goldsmith | |
| 2019/0290314 A1 | 9/2019 | Gemer et al. | |
| 2019/0374729 A1 | 12/2019 | Gomez et al. | |
| 2020/0078566 A1 | 3/2020 | Mitchell et al. | |
| 2020/0113718 A1 | 4/2020 | Westhoff et al. | |
| 2020/0121357 A1 | 4/2020 | Gomez et al. | |
| 2020/0129676 A1 | 4/2020 | Gomez et al. | |

* cited by examiner

DIFFERENT POSITIONS

INSERT INTO ORGAN

T-BAR OPENS

NEEDLES EXTEND INTO POSITION

INSERT GUIDE WIRE
AND SUTURE WIRE

GUIDE WIRE PASES

EXTRACTING PORT CLOSURE DEVICE

TIE SUTURE IN A FIGURE OF 8

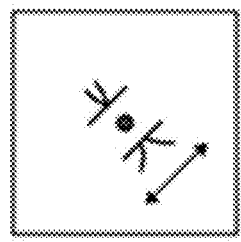
FIG. 10D
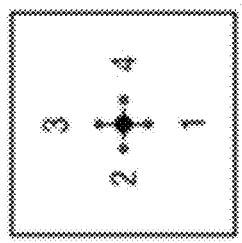
FIG. 10H
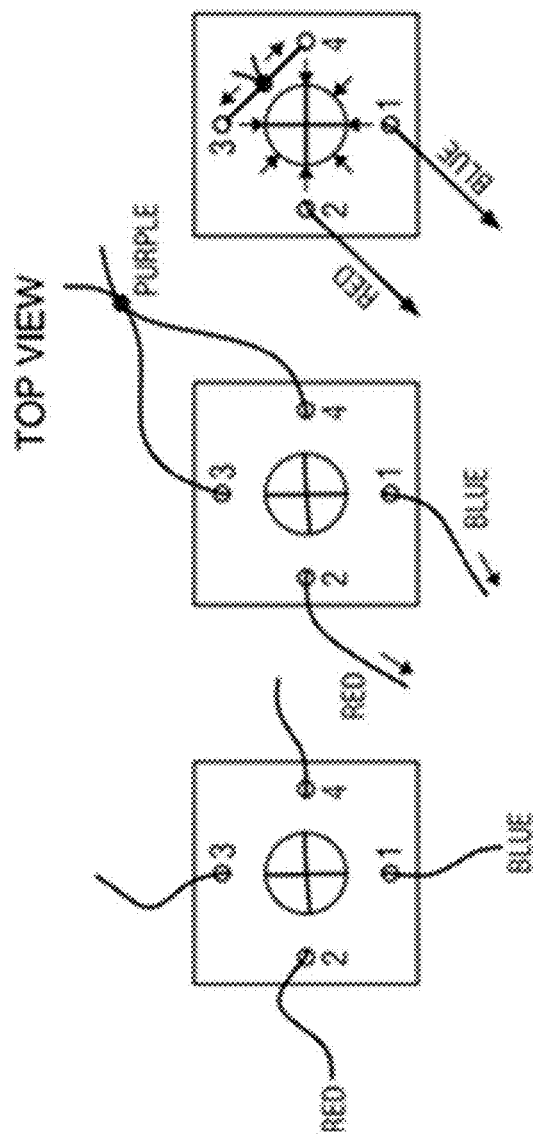
FIG. 10C
FIG. 10B
FIG. 10A
TOP VIEW
BOTTOM VIEW
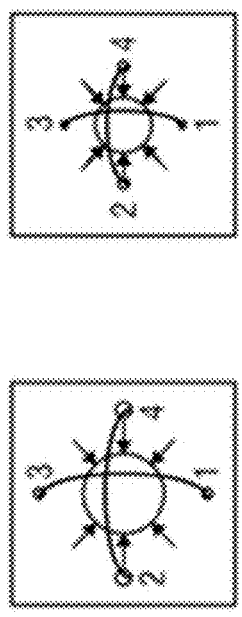
FIG. 10G
FIG. 10F
FIG. 10E

FIRST SUTURE KNOTTED CLOSED

INSERT PORT CLOSURE DEVICE
AND RUN GUIDE WIRE

EXTRACT PORT CLOSURE DEVICE

SINGLE SUTURE BARBS WITH MESH

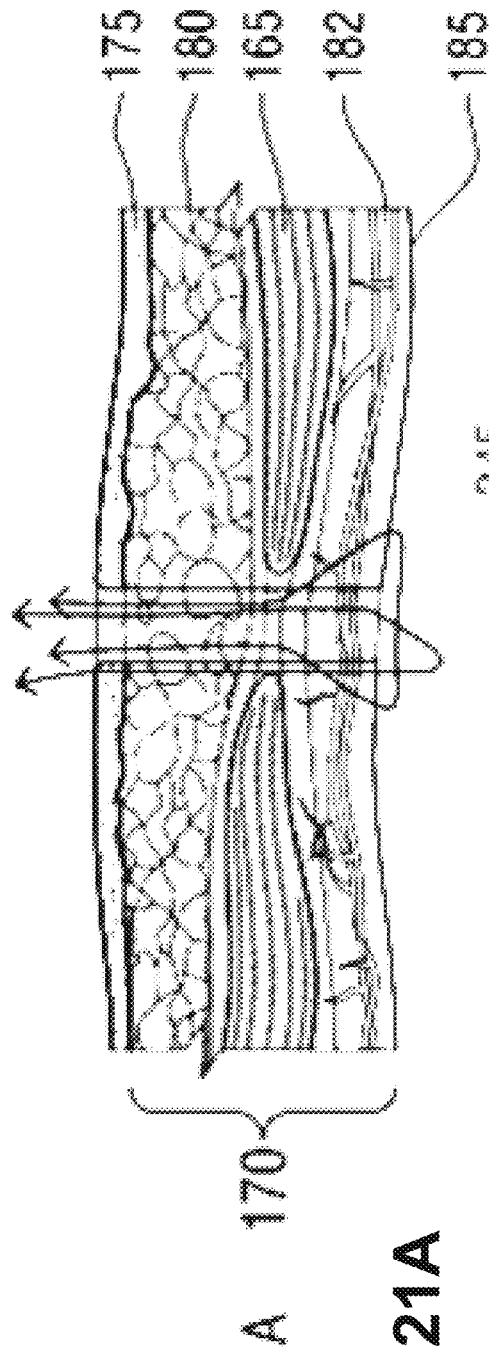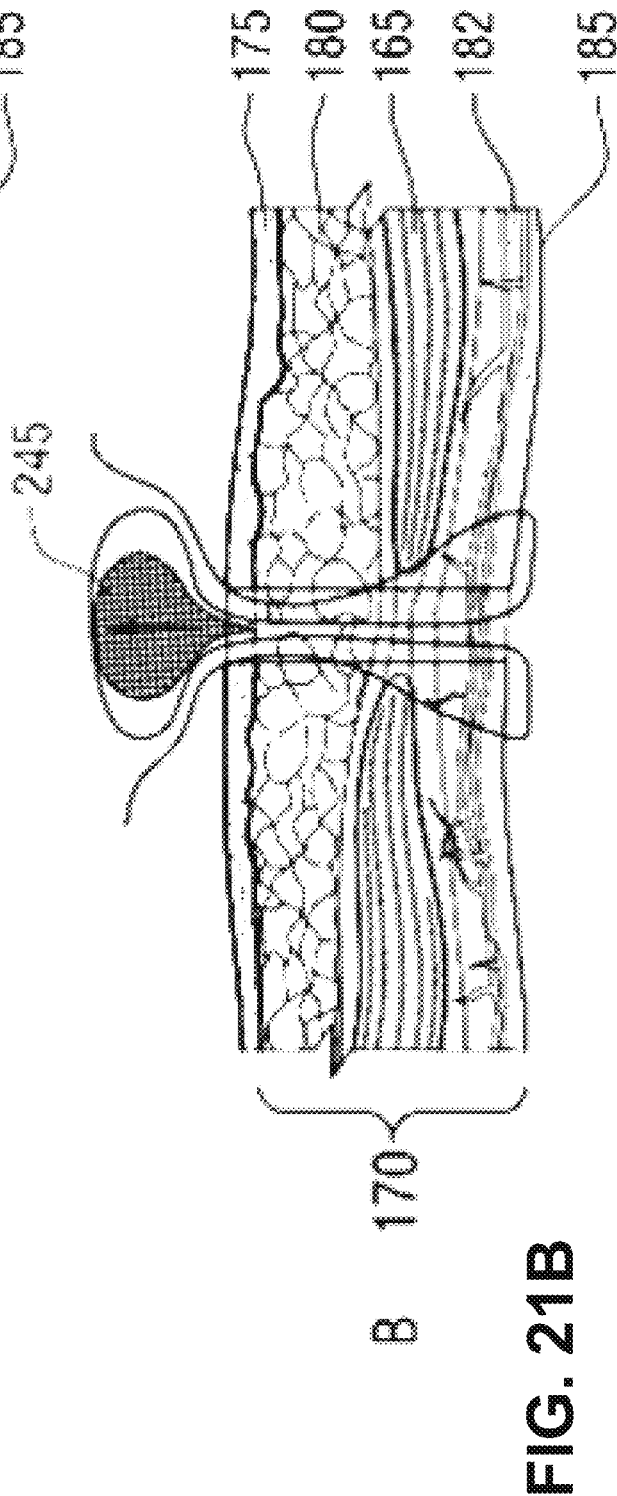
FIG. 21A
FIG. 21B

DOUBLE SUTURE WITH MESH CONTINUED

MULTI-PORT CLOSURE DEVICE, CORRESPONDING SUTURE MATERIAL AND MESH, A METHOD FOR REPAIRING AND CLOSING A FASCIAL DEFECT, AND RELATED DEVICES AND METHODS

CROSS-REFERENCE TO RELATED APPLICATIONS

This application is related to U.S. patent Application Ser. No. 15/275,896 filed Sep. 26, 2016 at the U.S. Patent and Trademark Office (Now U.S. Pat. No. 9,986,987 to Patel et al. entitled "Apparatus and Method for Fascial Closure Device for Laparoscopic Trocar Port Site and Surgery"), the disclosure of which is incorporated herein by reference in its entirety.

Further, this application claims priority to provisional patent app. No. 63/036,993 entitled "Simultaneous Multi-Suture Device and Method" filed on Jun. 10, 2020; and also claims priority to provisional patent app. No. 63/036,996 entitled "Laparoscopic Bi-Directional Colored Barbed Suture Method and System" filed on Jun. 10, 2020, the disclosures of both of which are incorporated herein by reference in their entirety.

FIELD OF THE INVENTION

The present invention relates to fascial closure devices and related methods, enhanced functionality of the same alone and in combination with medical sutures and/or mesh having interactive arrangements for cooperating with each other to expand operative features and further improve medical functionality. More particularly, the present invention relates to fascial closure or suture device arrangements for cooperating with features of related medical sutures and/or mesh arrangements for providing enhanced functions such as suture installation and retention, simultaneous multi-directional defect closure, and/or simplified, effective mesh installation via external engagement of the mesh with in vivo suture material, as well as methods for performing these and related functions.

BACKGROUND

The subject matter described in the present application generally relates to laparoscopic surgery and closing abdominal wall defects. More particularly, the present application is directed to tissue closure devices including surgical suture devices as well as devices that can be used for for intra-abdominal suturing, hernia repair, and closure of abdominal wall defects.

In the medical field techniques for repairing damaged oi diseased tissues are often used. In completing a surgical procedure various surgical methods employing sutures have been used to bind wounds, such as skin, muscles, tendons, internal organs, nerves and blood vessels. Wound closure devices, such as sutures and staples as well as other repair devices like meshes or patches are used to repair and reinforce wounds.

A barbed suture is a type of knotless surgical suture that has barbs on its surface. While suturing tissue, these barbs along an elongated suture wire, penetrate inside the tissue and lock them securely in place, eliminating the need for knots to tie the suture, Conventional sutures rely on a surgeon's ability to tie secure knots; barbed sutures provide a knotless alternative in surgical situations.

With minimally invasive laparoscopic surgeries, the ability to tie surgical knots quickly and properly has presented a new challenge for surgeons. In cases in which knot tying is difficult-, the use of knotless barbed suture wire can securely reapproximate tissues with less time, cost, and aggravation. The skills necessary to properly perform intra- or extracorporeal knot tying for laparoscopic surgery can be achieved with practice and patience.

Barbed sutures can be provide significant benefits for minimizing scaring and facilitating closing imperfections found in laparoscopic surgery. They are useful in many plastic surgery applications because of the seamless scaring they may leave.

Mesh is often used with conventional methods for repairing hernias and other fascial defects in the abdominal wall, Conventional methods for securing a mesh in the body is to place sutures around the periphery. The problem is that in laparoscopic surgery there is very little room to maneuver. Requiring the surgeon to pull the suture string through the abdominal wall, then when the two ends of the suture are outside the body the surgeon ties a knot and tries to place it as close to the mesh as possible. Cutting the excess suture outside the body then also further closing the open skin.

Hernias can occur anywhere in the abdominal wall, including around the belly button, through a surgical scar, in the diaphragm, or in the groin area. When the intestines or fat from the abdomen area bulges through the lower abdominal wall and enters the inguinal area, it is referred to as an inguinal hernia.

Hernias are repaired by surgical procedures in which an incision is made, the surgeon pushes the hernia back into the abdomen, and then the surgeon strengthens the abdominal wall at the site of the hernia with mesh and sutures. This surgery is often done under local anesthesia. Another way to correct this problem is through minimally invasive surgery.

In minimally invasive surgery the surgeon makes small, half-inch cuts in the abdomen and inserts a laparoscope, which sends back an image to a video monitor that the surgeon uses to see the hernia defect and perform the repair. Some of the risks of a Hernia repair are infections, bleeding, and pain. It is sometimes difficult to correct large hernias without using mesh. In these instances, a mesh device is used to support the abdominal wall.

For discussion purposes and example representations to assist with describing aspects and features for embodiments herein, reference is made to laparoscopic surgical instruments described in U.S. Pat. No. 9,986,987 to Patel et al. (herein "The Patel Patent"). The Patel Patent describes various configurations of an apparatus and related methods for treating tissue openings, such as an endoscopic trocar port opening created and used for a minimally invasive surgical procedure, including a suture placement device configured to rapidly, safety, efficiently and effectively close tissue defects created to access the intra-abdominal cavity during laparoscopic surgical procedures. The device as described is able to obtain adequate tissue adjacent to the tissue defect and provide a strong closure along with maintaining the pneumoperitoneum during the closure process, which includes techniques involving removal of the trocar from the port opening prior to placement of a fascial suture therein.

Despite the demonstrated effectiveness, reliability and other significant advantages proven by the suture placement device of the Patel Patent, concerns exist regarding the ability to close large and irregular defects such is hernias. In addition, continual challenges persist with respect to the duration of surgeries and the likelihood of complications increasing with duration, for which effective time-saving improvements and aids for improving efficiencies are consistently desired and pursued.

Referring now to FIGS. 1A to 1D, a diagrammatic plan view of a minimally invasive surgical environment is shown that illustrates significant benefits and advantages that can be provided via the use of an effective suture placement device 50' for port closure procedures. As shown in FIG. 1A, several small diameter ports are typically created through patient tissue for laparoscopic surgical procedures, such as intra-abdominal surgeries. These ports are often formed through the patient's skin 20' (i.e.; abdominal skin), fat layer 22', through a fascial layer 24', and sometimes muscles, which are each kept open as a laparoscopic port via use of a trocar port device 85'. The port depth A' is determined and a trocar port device 85' is selected to maintain the port during surgery along with a corresponding suture placement device 50' for closing the same.

The trocar port device 85' permits access for surgical instruments, laparoscopic cameras, and the like during surgery while simultaneously sealing the port to prevent the loss of inert gas. Inert gas, such as carbon dioxide, is typically pumped in through one or more ports to create a pneumoperitoneum space below the skin and above the surgical area to provide vital viewability for surgical procedures and maneuver space for surgical instruments and performing procedures. At the conclusion of the surgical procedures, these ports require effective suturing to close the corresponding wound and prevent herniation, which is best performed while maintaining the pneumoperitoneum and starting with effective placement of sutures at the fascial layer to close the port from the inside out.

Suture placement device 50' greatly enhances the ability of a surgeon to effectively place sutures starting at the fascial layer 24'. The approach of effectively placing fascial sutures first and moving outward has been shown to enhance healing, reduce pain, and greatly reduce the possibility that the port will reopen. An effective method for placing sutures using a suture placement device 50' is illustrated in FIGS. 1A to 1C, which includes inserting 62' the distal end of an elongated cannula of the suture placement device 50' through the corresponding port such that its distal end extends beyond the distal end of the trocar port device 85' followed by withdrawing 64' the trocar port device 85' over the suture placement device 50' as illustrated in FIG. 1A. The surgeon will select a suture placement device 50' having a diameter slightly less than the inner diameter of the trocar port device 85, such that suture placement device 50' is able to maintain the port opening and prevent significant gas leakage until sutures are placed and the port is closed. The suture placement device 50' is selected for the port such that its elongate cannula has a longitudinal length B' sufficient for extending internally beyond the distal end of the trocar port device 85', spanning the length of the port, and extending proximally an appropriate length for the surgeon to maintain control of the suture placement device and effectively use it for suture procedures.

The suture placement device 50' is used to position a suture for closing intra-abdominal defects generated by surgical laparoscopic trocar ports and other puncturing devices, and to do so without any exposed sharps, which is enabled due to the suture placement device creating the suture path within the device and the suture being loaded therethrough. This is accomplished, in part, via rotation 66' of a pivot bar or 'T-bar' disposed at the distal end of the suture placement device 50' about ninety degrees from its longitudinal orientation during insertion, such that the pivot bar is substantially parallel with the fascia layer 24' and skin 20', and extends across and beyond the width of the port as shown in FIG. 1B. Thereafter, the suture placement device 50' is withdrawn 68' externally until the top portions of the pivot bar are in contact with the fascia layer 24'.

Referring to FIGS. 1C and 1D, stylet guides disposed on opposite lateral sides of the cannula of the suture placement device 50' are pushed downward 70' or extended distally 70' through the fascia (and muscle as appropriate) until each stylet guide connects with and extends into corresponding openings formed in the rotated pivot bar. The elongate cannula of the suture placement device, the pair of stylet guides, and the pivot bar each define channel segments therein. Upon connection of each stylet guide with and extending into the corresponding openings formed in the rotated pivot bar, the internal channel segments connect to form an uninterrupted internal channel pathway 80 within the suture placement device that extends through the fascia layer along a desired suture path.

As can be seen in FIG. 1D, the internal channel pathway defined through the suture placement device 50' extends from an entry port 81' formed at a proximal portion of the device longitudinally downward or distally within a first channel formed in the elongate cannula of the suture placement device to and through a first one of the stylet guides. The channel pathway 80' continues uninterrupted around and through the rotated pivot bar at the distal end of suture placement device turning into and upwardly or proximally through the second one of the stylet guides. The channel pathway continues proximally through a second channel formed in the elongate cannula to an exit port 83' formed at the proximal portion of the device. Thus, once suture placement device 50' has been placed or installed within, a port to be closed, and has been prepared for placement of a fascial suture or other suture, the suture placement device 50' defines therethrough an uninterrupted channel pathway 80' along a desired suture path.

After the suture thread has been directed through the channel pathway and extends along the pathway, the suture thread is in place to form a highly effective suture through the fascia layer 24' for closing the defect. Once a suture thread is placed along the channel pathway, thin lateral slots along the stylet guides and pivot bar allow the suture thread to slide out of the channel pathway 80' and the suture placement device 50' while maintaining the desired placement through the fascia layer to establish the suture. The stylet guides can be withdrawn upward or proximally and the pivot bar can be rotated back to its initial elongate position to facilitate the suture thread withdrawing from the device while maintaining its suture position, as well as partial or complete proximal withdrawal of the suture placement device 50 out of the port as appropriate for releasing and completing the suture. Thereafter, a suture can be tightened and tied off to close the port at the fascia layer.

It is understood that the same, related or similar surgical devices including other configurations of suture placement devices could also be used for discussion and description purposes with respect to inventive features discussed herein. In addition, advantageous aspects and features of embodiments described herein nonetheless apply to many different and varied surgical devices including various suture placement devices and other surgical devices, and are not limited to use with the example suture placement device. Thus, although aspects and features described herein provide significant benefits and advantages for usage with a suture placement device and/or even the configuration of a suture placement device described as an example for discussion purposes including configurations of the Patel device, it is understood that the subject matter described herein is not so limited.

There is a need in the field for a Laparoscopic device capable of overcoming various drawbacks and challenges of conventional devices and significantly improving techniques, devices and related technology for closing defects. Further, there is a need for improved methods and techniques for wound closure enhancement including for irregular shaped wounds along with mitigating hernia concerns, as well as Laparoscopic devices for supporting the same.

SUMMARY

One general aspect discussed herein along with example arrangement and method includes a multi-port closure device. The multi-port closure device includes a cannular housing configured for percutaneous insertion through a fascial port, the housing having a proximal portion, an opposite distal portion, and a longitudinal axis oriented therebetween. The device also includes a first opposing pair and a second opposing pair of needle guides defined within the cannular housing each extending longitudinally between the proximal and distal portions and each defining a lengthwise suture path segment. The device also includes a cross-channel assembly coupled to the distal portion of the cannular housing and movable between a first arrangement aligned with the cannular housing longitudinal axis for device installation and removal and a second arrangement for simultaneously establishing a plurality of suture pathways through the multi-port closure device.

The cross-channel assembly can include: a pivot coupling centrally attached to the cannular housing distal portion; a cross-channel control member connecting the pivot coupling with a cross-channel controller disposed along an intermediate portion of the cannular housing for controlling movement of the cross-channel assembly between the first and second arrangements; and a first opposing pair and a second opposing pair of rotatable guide arms oriented parallel with the longitudinal axis and disposed about the canular housing distal portion in the first arrangement, each rotatable guide arm having an inboard region movably connected to the pivot coupling and an opposite outboard region extending away from the pivot coupling, each rotatable guide arm defining a cross-channel suture path segment between the inboard and outboard regions. The device also includes the first opposing pair of rotatable guide arms extending from the pivot coupling opposite each other.

In the second arrangement, the first opposing pair of rotatable guide arms interconnect each of the cross-channel suture path segments to form a first T-bar oriented perpendicular to the longitudinal housing axis and defining a first cross-channel suture path between opposite end regions of the first T-bar. The device also includes each of the first t-bar opposite end regions interfacing a corresponding one of the first pair of opposing needle guides and connecting the opposite end regions of the first cross-channel suture path to a corresponding one of the lengthwise suture path segments of the first pair of opposing needle guides, the lengthwise suture path segments of the first pair of opposing needle guides and the first cross-channel suture path forming a first suture pathway through the multi-port closure device. The device also includes the second opposing pair of rotatable guide arms extend from the pivot coupling opposite each other and interconnecting each of the cross-channel suture path segments to form a second T-bar oriented perpendicular to the longitudinal housing axis and defining a second cross-channel suture path between opposite end regions of the second T-bar. The device also includes each of the second T-bar opposite end regions interfacing with a corresponding one of the second pair of opposing needle guides and connecting the opposite end regions of the second cross-channel suture path with a corresponding one of the lengthwise suture path segment of the second pair of opposing needle guides, the lengthwise suture path segments of the second pair of opposing needle guides and the second cross-channel suture path forming a second suture pathway through the multi-port closure device.

The device also includes the first and second T-bars extending across a width of the cannular housing and central region in a transverse, angularly spaced arrangement. The device also includes when the multi-port closure device is disposed through a percutaneous facial port centrally aligned with a defect and the device is in the second arrangement, the multi-port closure device simultaneously establishes the first and the second suture pathways arranged to extend across a width of a defect and central region thereof and implement suture bites centered about a perimeter of the defect in an angularly spaced, equidistant orientation.

Implementations may include one or more of the following features. The multi-port closure device where: each of the first and second cross-channel suture path segments define an elongate gap through a distal wall portion of each T-bar along a length of suture path segment, each elongate gap having a thickness less than an inner diameter of the suture path segment and forming an elongate throttled opening through the distal wall portion of each TF-bar with an interior of each suture path segment; and a width of the throttled opening corresponding with an outer diameter of a suture material operable with the multi-port suture device for retaining the suture material when routed through the multi-port closure device for suture procedures and allowing removal of the suture material through the elongate gap for removal of the multi-port closure device. Each of the first and the second suture pathways have an inner diameter configured to retain barbs of a barbed suture material in a non-deployed position closely aligned with a longitudinal axis of the barbed suture material.

Another general aspect can include the multi-port closure device in a combined arrangement including the routed suture material extending through one of the first and second suture pathways, which can be in an unsecured condition. The combined arrangement can include each elongate gap arranged to retain the unsecured routed suture material during movements from the second arrangement to the first arrangement and pulling central regions of the unsecured suture material into and at least partially through the fascial port along with removing the multi-port closure device from the defect.

An additional general aspect can include a customized medical mesh having an arrangement facilitating an external interconnection between the medical mesh and center regions of a pair of elongate suture materials. The customized medical mesh also includes a body defining a first extended surface region and an opposite second extended surface region, at least one of the first extended surface region and the opposite second extended surface region defining a defect contact region, the defect contact region sized to define a cross-sectional surface area greater than a cross-sectional area across a corresponding fascial defect. The mesh also includes a mesh matrix disposed between the first extended surface region and the opposite second extended surface region. The mesh also includes at least one suture material engagement feature defined along one of the first extended surface region and the opposite second extended surface region, the at least one suture material engagement feature including: a plurality of geometric features disposed at the one of the first extended surface region and the opposite second extended surface region, the plurality of geometric features spaced apart from each other in an alternating pattern of orientations, each of the geometric features having a fixed attachment portion integrally connected to the mesh matrix and a plurality of movable portions having a discontinuous connection to the mesh matrix; and at least one quick-connect suture channel defined by a plurality of the alternating geometric features arranged to align each of the fixed attachment portions in the alternating arrangement. The mesh can also be customized for secure interconnection with a suture material without implementing a rigid interconnection structure into the mesh that can degrade mesh performance when engaging a fascial defect.

Another general aspect can include a method for repairing and securely closing a fascial defect. The method also includes installing a first elongate suture material within a first predetermined suture pathway with respect to the fascial defect, the first predetermined suture pathway including a first position disposed a radial distance from a center of the fascial defect and located about a perimeter region of the fascial defect and an opposite second position disposed the same radial distance from the center of the fascial defect and located about the perimeter region at an orientation from the first position that bisects the center of the fascial defect in a first direction opposite from the first position and across a width of the fascial defect, a first end portion of the first elongate suture material disposed at the first position and an opposite second end portion of the first elongate suture material disposed at the second position. The method also includes installing a second elongate suture material within a second predetermined suture pathway with respect to the fascial defect, the second predetermined suture pathway including a third position disposed the same radial distance from the center of the fascial defect as the first and second positions and located about the perimeter region of the fascial defect and an opposite fourth position disposed the same radial distance from the center of the fascial defect and located about the perimeter region at an orientation from the third position that bisects the center of the fascial defect in a second direction, the second direction opposite from the third position, across a width of the fascial defect, and angled transverse to the first direction from the first position to the second position, a third end portion of the second elongate suture material disposed at the third position and an opposite fourth end portion of the second elongate suture material disposed at the fourth position. The method also includes closing the fascial defect including engaging the first elongate suture material concurrent with the second elongate suture material and simultaneously reducing spacing an equal amount between each of the first, second, third and fourth end portions with respect to the center of the fascial defect. The method also includes securing each of the first, second, third and fourth end portions about the center of the fascial defect at a bite position corresponding with each of the end portions. The method also includes where each of the bite positions are located equidistant from the fascial defect center at transverse orientations across the center of the fascial defect.

Implementations may include one or more of the following features. The method may include: prior to performing the actions of closing the fascial defect including engaging the first elongate suture material concurrent with the second elongate suture material and simultaneously reducing spacing, and securing each of the first, second, third and fourth end portions about the center of the fascial defect: drawing a center portion of at least one of the first elongate suture material and the second elongate suture material through the fascial defect to an outboard location of a body with respect to the fascial defect; establishing a firm interface with at least a first mesh material; and withdrawing the center portion of the at least one of the first and second elongate suture material through the fascial defect, withdrawing the center portion including concurrently drawing the at least one mesh material through the fascial defect; the method may include: arranging at least one mesh engagement surface in a centered orientation facing the fascial defect at a location proximate the fascial defect; and securing the at least one mesh engagement surface in the centered orientation and the location proximate the fascial defect.

Other aspects and advantages according to aspect, features, innovative concepts and implementations discussed along with example devices, arrangements and methods pertaining to the present invention will become apparent from the following detailed description, which when taken in conjunction with the accompanying drawings illustrates by way of example principles of the invention.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 10A to 10D are schematic top (external; proximal) plan views corresponding with the example defect closure actions of FIGS. 5 to 9 without showing the example multi-port closure device, which schematically depict suture movements and actions that can be performed with the example suture connections of FIGS. 8 and 9 for forming a FIGURE EIGHT KNOT therewith shown from a top view of the suture threads.

FIGS. 10E to 10H are schematic (interior; distal) bottom interior plan views corresponding with the example closure actions of FIGS. 5 to 9 without showing the example multi-port closure device, which schematically depict the suture movements and actions corresponding with FIGS. 10A to 10D showing formation of the suture knot as it goes through the closing process.

FIGS. 16C and 16D schematically represent a further optional example configuration of a cross-channel assembly of a multi-suture closure device according to aspects and features describe herein, in which FIG. 16C depicts a plan view in the first arrangement of the cross-channel assembly optional configuration defining an elongate gap extending through a wall portion of each rotatable arm of the assembly into cross-channel suture segment defined therein, and FIG. 16D depicts optional extended features of multi-port closure devices described herein for catching and pulling a central portion of a suture material installed about a defect for engaging an optional mesh material and using suture placement movements for additionally placing and securing the mesh material.

FIGS. 17 to 18B schematically depict further options for providing enhanced functionality in combination with multi-suture closure device aspects and features described herein, in which optional features and functional enhancements can be provided via combining arrangements of barbed suture material with aspects and features described herein along with example arrangements of multi-port closure devices, in which FIG. 17 illustrates insertion of customized bi-directional barbed suture material through a suture pathway of an example multi-port closure device having an optional arrangement with the suture material for retaining the barbs in a non-deployed position for routing the suture material along a suture pathway.

FIGS. 18A and 18I schematically depict optional aspects and features pertaining to use of an example multi-port closure device according to aspects and features described herein in combination with the bi-directional double barbed suture material of FIG. 17, in which FIGS. 18A and 18B schematically represent optional placement and alignment markings that can be incorporated with bi-directional double barbed suture combinations usable with multi-port closure devices according to aspects and features described herein.

FIG. 21A schematically illustrates the example perspective view of FIG. 144 arranged for use with mesh showing suture wires or thread simultaneously placed about a defect using the example multi-port closure device of FIGS. 4 to 13.

FIG. 21B schematically illustrates the example perspective view of FIG. 21A for use with mesh.

DETAILED DESCRIPTION OF THE DRAWINGS

Figure 1A:
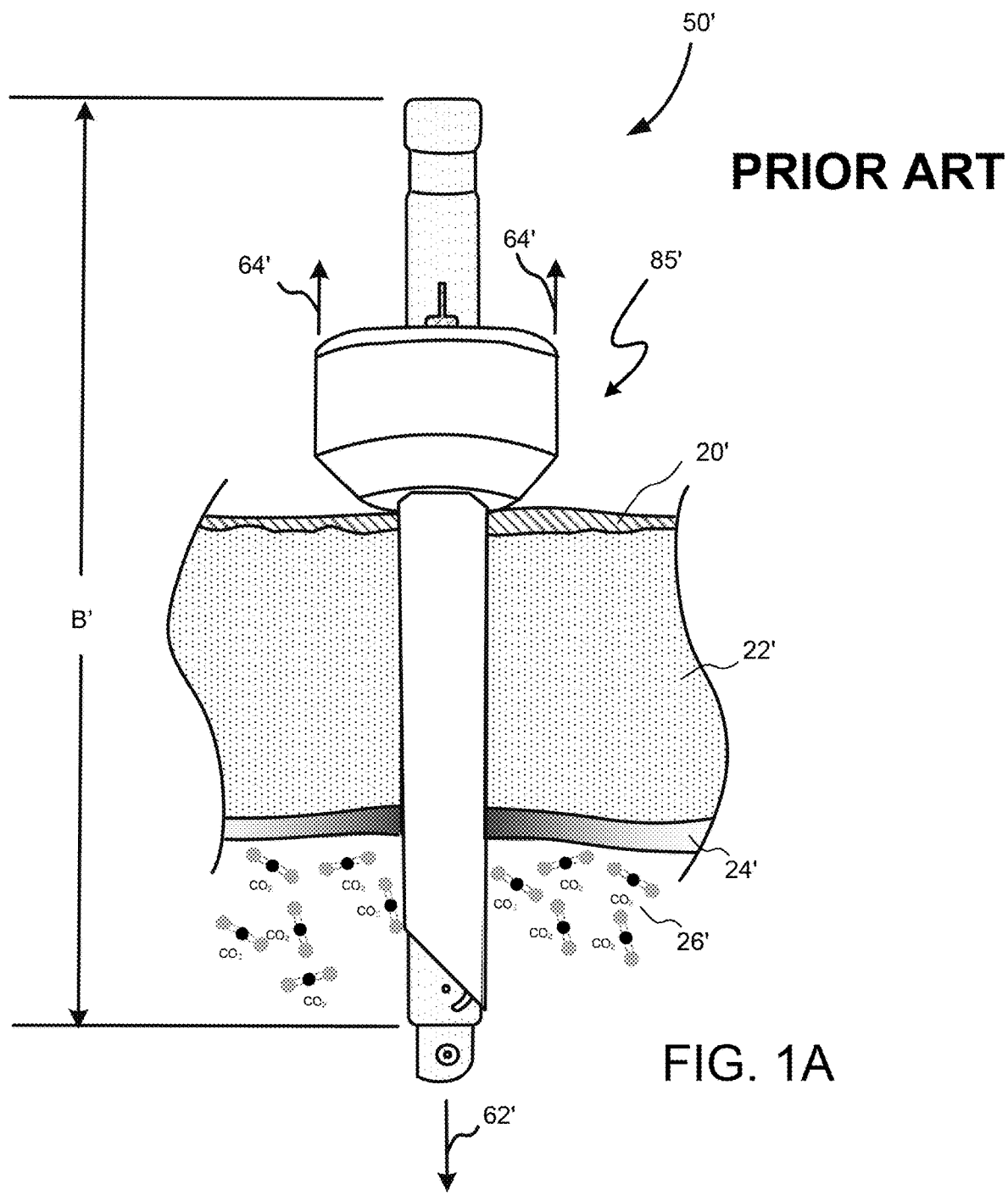
FIG. 1A is a diagrammatic plan view of a minimally invasive surgical environment configured to use an example prior art surgical device in the form of a suture placement device that can be supported by aspects and features of guide wire advancers discussed herein, for which the suture placement device and corresponding diagrammatic surgical environment are described and shown in FIGS. 1A to 1D for discussion purposes to assist with describing aspects and features described herein; To Wit, the diagrammatic surgical environment shown includes a prior art trocar device installed through a laparoscopic surgery port formed through patient tissue along with the example prior art suture placement device inserted therethrough in preparation for port closure procedures.
Figure 1B:
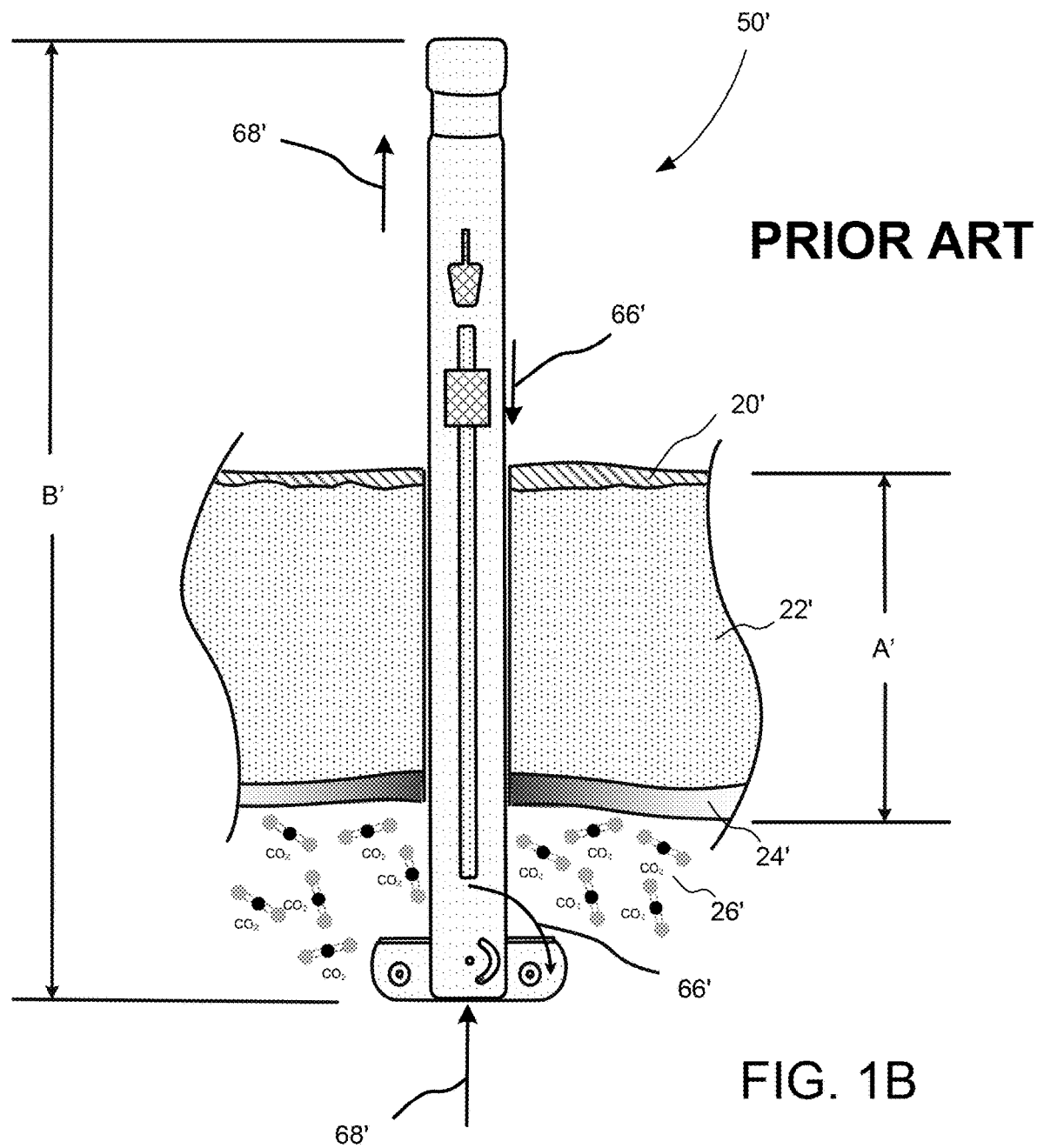
FIGS. 1B and 1C are plan views showing example actions pertaining to arranging the suture placement device of FIG. 1A for placement of a suture, for which aspects and features discussed herein are related.
Figure 1C:
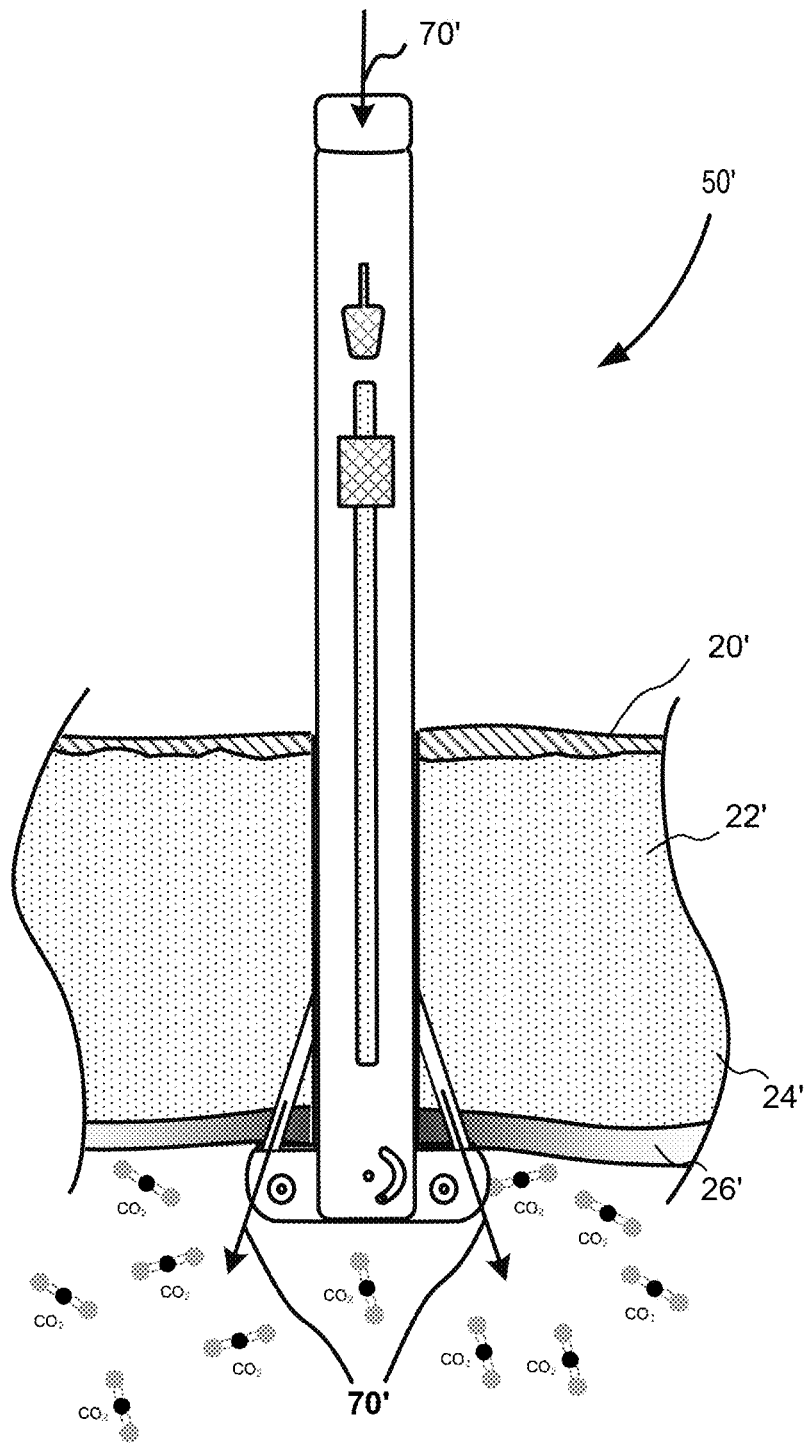
Figure 1D:
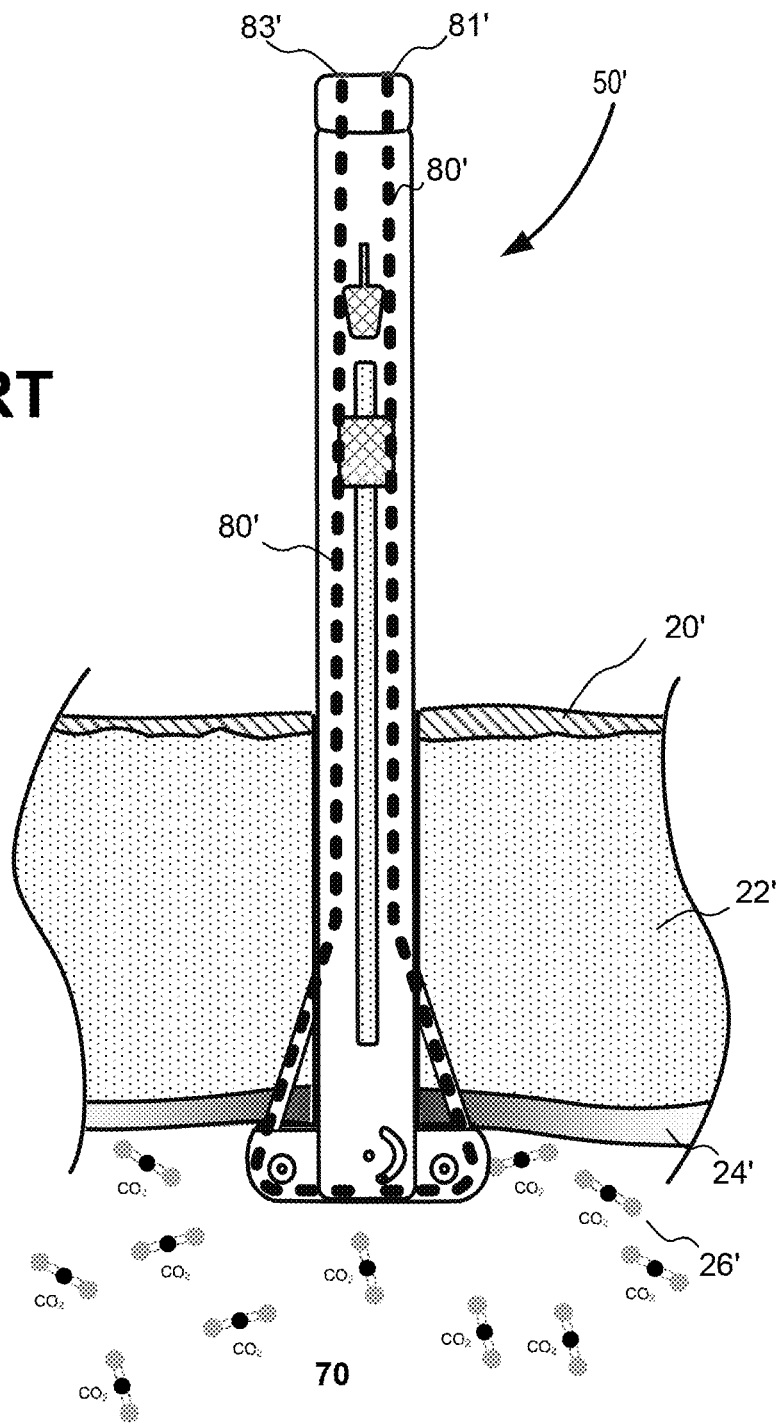
FIG. 1D is a plan view showing an arrangement of the suture placement device of FIG. 1A prepared for placement of a suture prior to introduction of a guide wire including having a channel pathway established through the device corresponding with a desired return loop pathway for the suture along with the guide wire in advance of suture material.

While the various features of this invention are hereinafter described and illustrated as being particularly adapted for providing rigidity to instrument devices the invention is not limited to the embodiments illustrated in the drawings but are merely used to illustrate the wide variety of uses of this invention. Therefore, the foregoing is considered as illustrative only of the principles of the Invention. Since numerous modification and changes will readily occur by those skilled in the art, it is not desired to limit the invention to the exact construction and operation shown and described and accordingly, all suitable modifications and equivalents may be resorted to, falling within the scope of the invention.

Aspects, features and concepts described herein pertaining to surgical apparatus, methods, and devices are directed to apparatus and methods for closing tissue opening including puncture wounds, hernias, endoscopic trocar port openings used in minimally invasive surgical procedures, and other abdominal wall defects in the fascia. Aspects, concepts and features pertaining to a suture placement device are discussed for rapidly, safely, efficiently and effectively repairing hernias and other tissue defects in a human body.

Example devices as described herein can be able to obtain adequate tissue adjacent to the tissue defect to provide a strong closure, to maintain pneumoperitoneum needed for appropriate visualization of the peritoneal contents during the closure process, and to protect the vital structures within the abdominal cavity in the vicinity and the healthcare provider for risk of injury.

There is currently no single device that provides means similar to examples discussed herein for suturing an internal organ defect and performing fascial port closure with 4 simultaneous multiple tissue bites. These and other novel and innovative concepts and improvements discussed herein can be performed using a single device according to aspects and features described herein along with example arrangements, which can include for example applying a nerve block with the same device and method for performing fascial port closure. Other enhancements, concepts and features described herein can include implementation of significantly improved closures, which can be further improved by adhering to Johnsson-Israelson rules and guidelines for fascial closure, such as implement symmetrical and evenly spaced suture bites equidistant from a center of a defect, such as 1 cm.

As used herein, the term "about" when used in connection with a referenced numeric indication means the referenced numeric indication plus or minus up to 10 percent of that referenced numeric indication. For example, the language "about 50" covers the range of 45 to 55, Similarly, the language "about 5" covers the range of 4.5 to 5.5.

As used herein, the term "target workspace" refers to anything within or pertaining to the endoscopic work cavity including the body of the patient, tissues and organs within the cavity, and tissue defining the cavity, and also to support structures for the MIS procedure including a cover and cannula supports, instruments and related attachments or medical implements including needles, suture materials, implants, meshes, etc. As used herein, the term "target tissue" refers to any tissue or organ that interacts with the target workspace including tissues and organs of the patient, natural tissues and organs introduced to the target workspace including natural transplant tissues and organs, artificial tissues and organs including mechanical or electro-mechanical organs, and tissue and organ assist devices such as pacemakers, mesh material, artificial skin and the like.

As used herein, a surgical device or tool or clinical instrument refers to a medical instrument having contact surfaces that are configured to engage organs, tissues and/or portions of a surgical cavity or wound to thereby move, hold, lift, retain, suture or otherwise engage, interface or make contact with the target tissue and perform clinical functions as appropriate for the surgical environment. The term "flexible" in association with a part, such as a mechanical structure, component, or component assembly, should be broadly construed. In essence, the term means the part can be repeatedly bent and restored to an original shape without harm to the part. Certain flexible components can also be resilient. For example, a component (e.g., a flexure) is said to be resilient if possesses the ability to absorb energy when it is deformed elastically, and then release the stored energy upon unloading (i.e., returning to its original state). Many "rigid" objects have a slight inherent resilient "bendiness" due to material properties, although such objects are not considered "flexible" as the term is used herein.

A flexible part may have infinite degrees of freedom (DOF's). Flexibility is an extensive property of the object being described, and thus is dependent upon the material from which the object is formed as well as certain physical characteristics of the object (e.g., cross-sectional shape, length, boundary conditions, etc.). For example, the flexibility of an object can be increased or decreased by selectively including in the object a material having a desired modulus of elasticity, flexural modulus, and/or hardness. The modulus of elasticity is an intensive property of (i.e., is intrinsic to) the constituent material and describes an object's tendency to elastically (i.e., non-permanently) deform in response to an applied force, A material having a high modulus of elasticity will not deflect as much as a material having a low modulus of elasticity in the presence of an equally applied stress. Thus, the flexibility of the object can be decreased, for example, by introducing into the object and/or constructing the object of a material having a relatively high modulus of elasticity.

As used in this specification and the appended claims, the word "distal" refers to direction towards a work site, and the word "proximal" refers to a direction away from the work site. Thus, for example, the end of a tool that is closest to the target tissue would be the distal end of the tool, and the end opposite the distal end (i.e., the end manipulated by the user or coupled to an actuation shaft) would be the proximal end of the tool.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures were turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations. The combination of a body's position and orientation define the body's pose.

Similarly, geometric terms, such as "parallel", "perpendicular" "round", or "square", are not intended to require absolute mathematical precision, unless the context indicates otherwise, Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an" and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

Unless indicated otherwise, the terms apparatus, medical device, instrument, and variants thereof, can be interchangeably used.

Figure 2A:
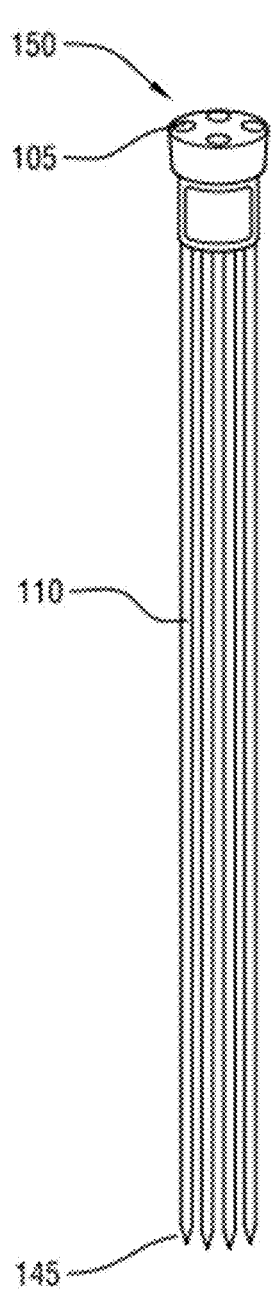
FIG. 2A is aschematic plan view of a stylet assembly having multiple needled stylets according to aspects and features discussed herein pertaining to example multi-port closure device arrangement and related methods and devices.
Figure 2B:
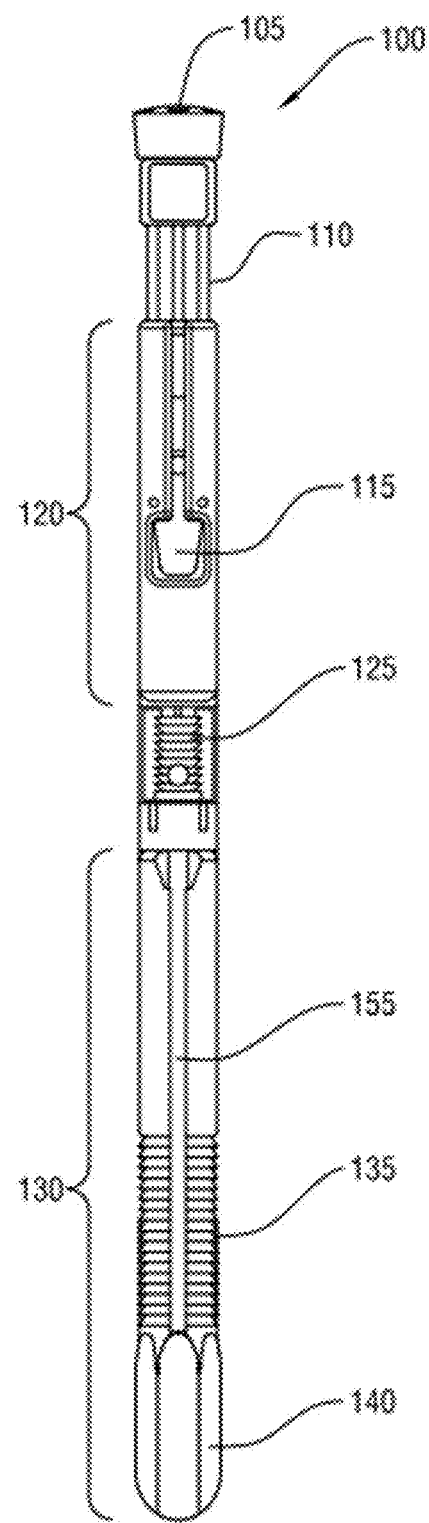
FIG. 2B is a schematic plan view of an example multi-port closure device according to innovative aspects and features discussed herein.

Referring now to FIGS. 2A and 2B, a Multi-Port Closure Device (150) is illustrated in FIG. 2A having a multi-Port opening (105) that is used to administer analgesics, to provide a path for entering a suture guide wire, and sutures shown in later depictions. Multi-Port Stylets (110) are shown corresponding with the number of openings made for passing suture strings (230), The Multi-Port Distal End (145) is the area where the analgesic, suture guide wire, and sutures exit the stylets (110).

With respect to FIG. 2B the Multi-Port Guidance Device (150) is inserted into the Proximal Section of Multi-Port Closure Device (120) forming the basis of the Multi-Port Closure Device (100), A Proximal Section (120) and a Distal Section (130) of the Multi-Closure Device (100) is illustrated forming the basis of the device. A Stylet Release Button (115) is used to retrieve the Multi-Port Stylet (110) which is actuated by an internal spring that cause the distal end to retract outwards, Included is a T-Bar Pivot Tab (125). A Multi-Port T-Bar Controller (155) is used to extend and retract the T-bar Device (140). Multi-Port Closure Gripping Ribs (135) are located near the distal end of the device (130).

Figure 2C:
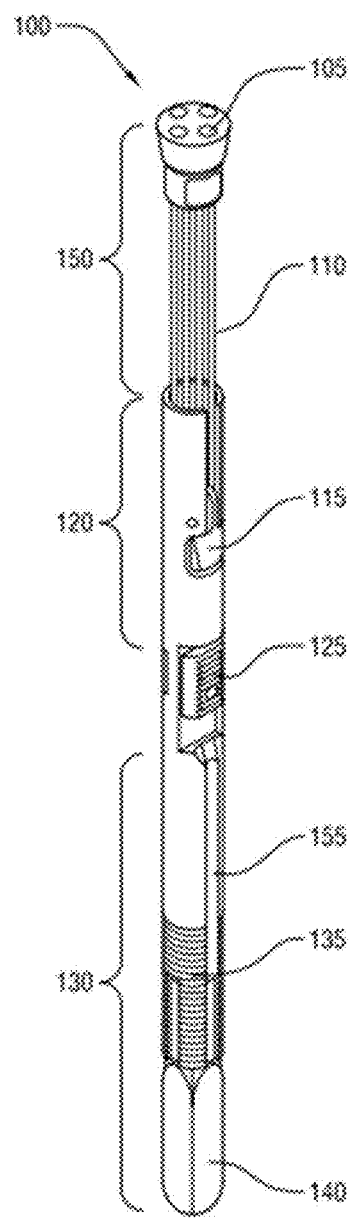
FIG. 2C is a schematic perspective view of a further example multi-port closure device shown partially exploded at an upper region and depicting a stylet assembly inserted through a top assembly thereof and depicting a cross-channel assembly at a distal portion while in a first arrangement.

With respect to FIG. 2C the top section (150) of the Multi-Port Closure Device (100) is shown as it is guided inside the main assembly.

Figure 2D:
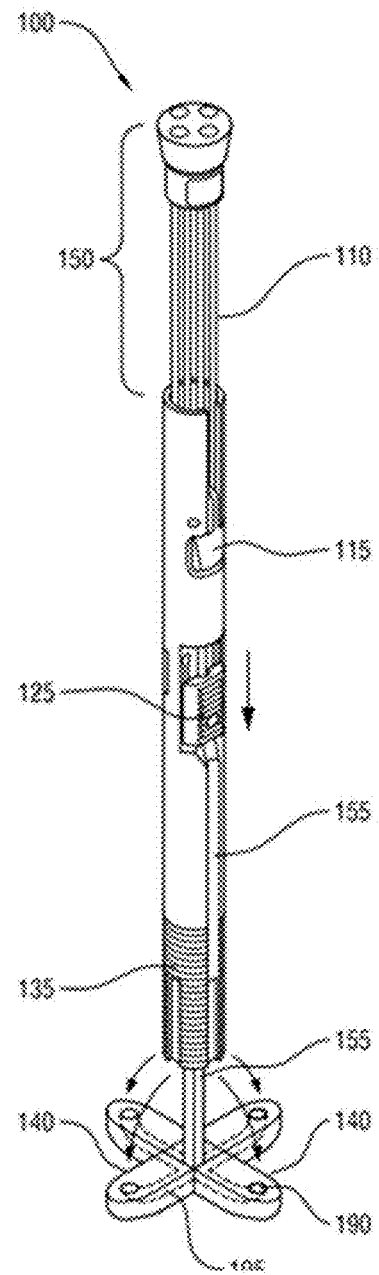
FIG. 2D is a schematic perspective view of the multi-port closure device of FIG. 2C depicting movements of the cross-channel assembly from the first arrangement of FIG. 2C toward a second arrangement.
Figure 2E:
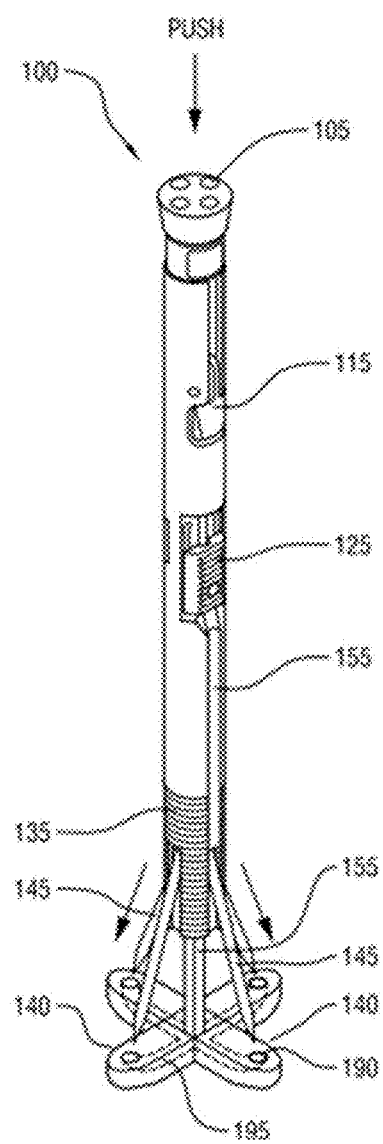
FIG. 2E is a schematic perspective view of the multi-port closure device of FIGS. 2C and 2D depicting the cross-channel assembly in the second arrangement.
Figure 21C:
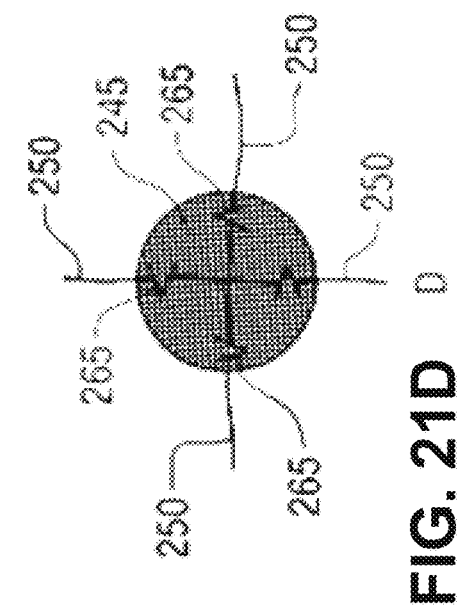
FIGS. 21C and 21D schematically illustrates top plan views of the mesh and portions of the suture wires or thread of example perspective view of FIG. 21A depicting mesh attachment.
Figure 21D:
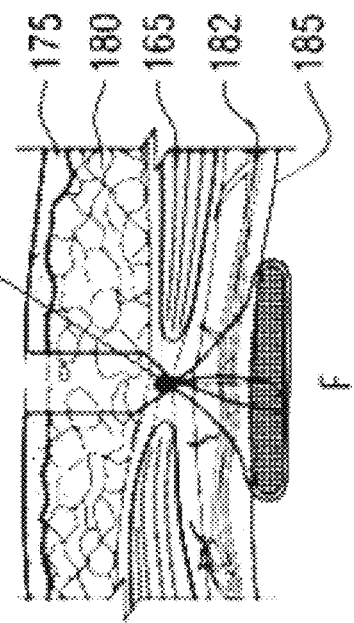
Figure 21E:
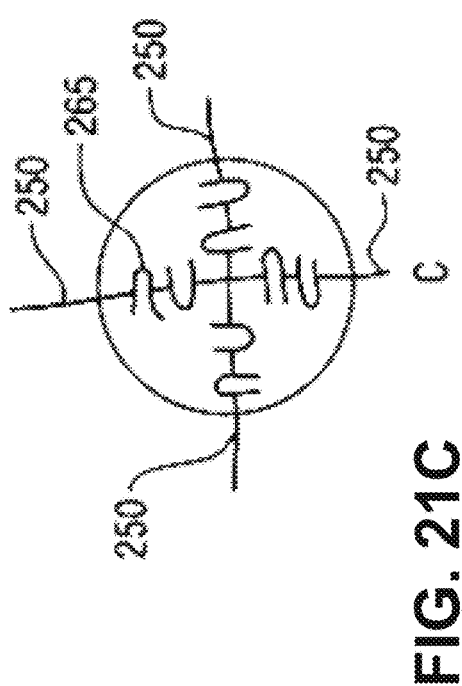
FIG. 21E schematically depicts a perspective view of double suture knots implemented using the example multi-port closure device of FIGS. 4 to 13 showing use with mesh.
Figure 21F:
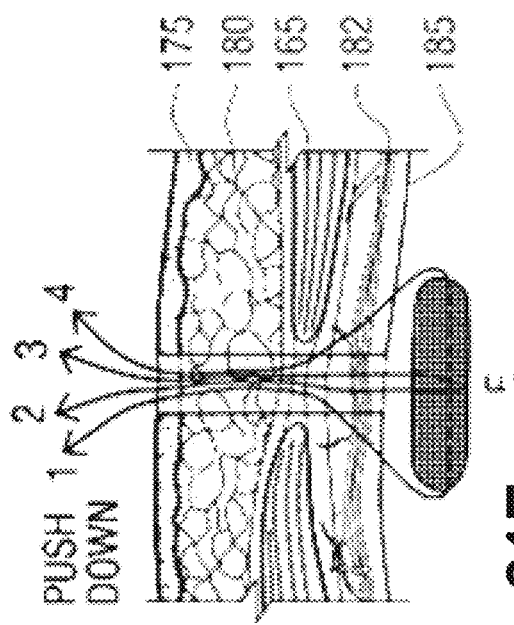
FIG. 21F schematically depicts a perspective of completed double suture knots.

With respect to FIGS. 2D and 21E the T-Bar Device is extended showing the Stylet Receptacle Area (190) and the Suture Passage Area (195).

Figure 3A:
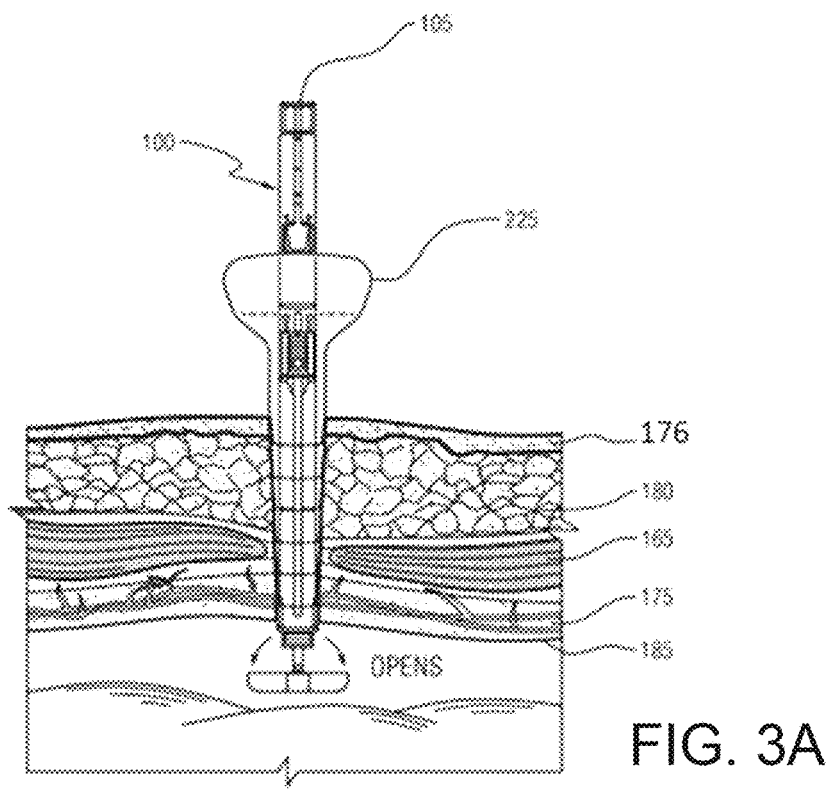
FIG. 3A is a schematic plan view of an example multi-port closure device that schematically illustrates an example deployment of the device according to aspects and features of example multi-port closure devices and showing entry of the example device into an optional trocar device and depicting movement of the cross-channel assembly from the first arrangement toward the second arrangement for performing surgical closure techniques.
Figure 3B:
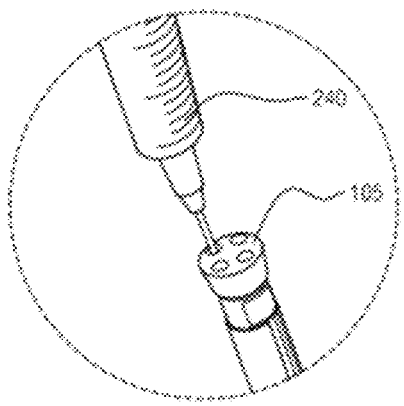
FIG. 3B is a schematic top perspective view of a proximal end of the example multi-port closure device of FIG. 3A.
Figure 3C:
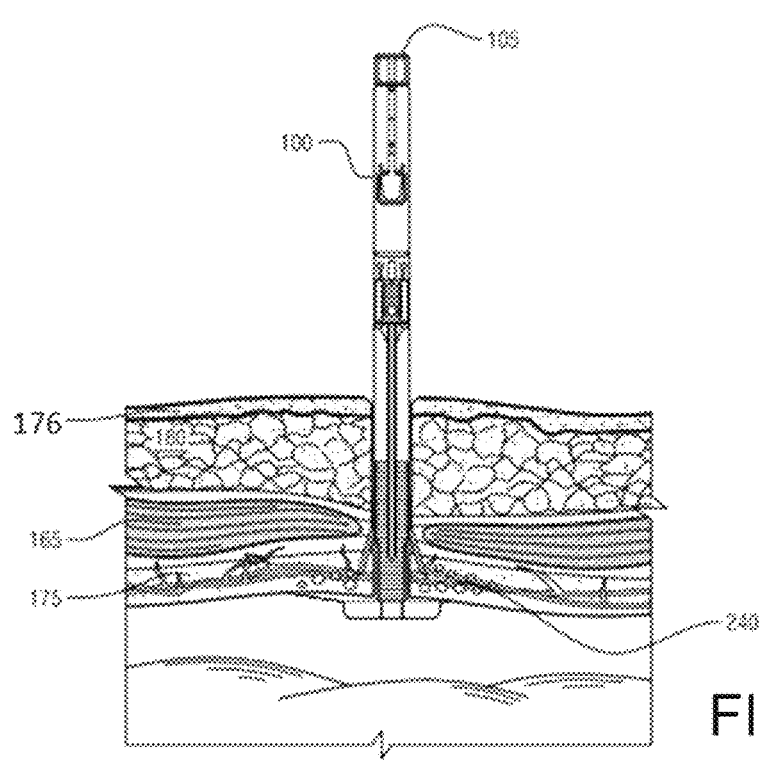
FIG. 3C is a schematic plan view of the example multi-port closure device of FIG. 3A that illustrates a syringe having an analgesic being inserted into a port opening of an example stylet assembly.

With respect to FIG. 3A, the Multi-Port Closure Device (100) is inserted through a Trocar (225), beginning the insertion process and the T-Bar is extended to expand, FIG. 3B illustrates how an Analgesic (240) is inserted into the Multi=Port Opening (105). The Upper Facia Area (176), the Tatty Tissue (180), Rectus Sheath (165) and the Pre-Peritoneum Nerves (175) are illustrated with respect to each other. Once the Analgesic (240) enters the Pre-Peritoneum Nerve Area (175) that is anesthetized.

Figure 4:
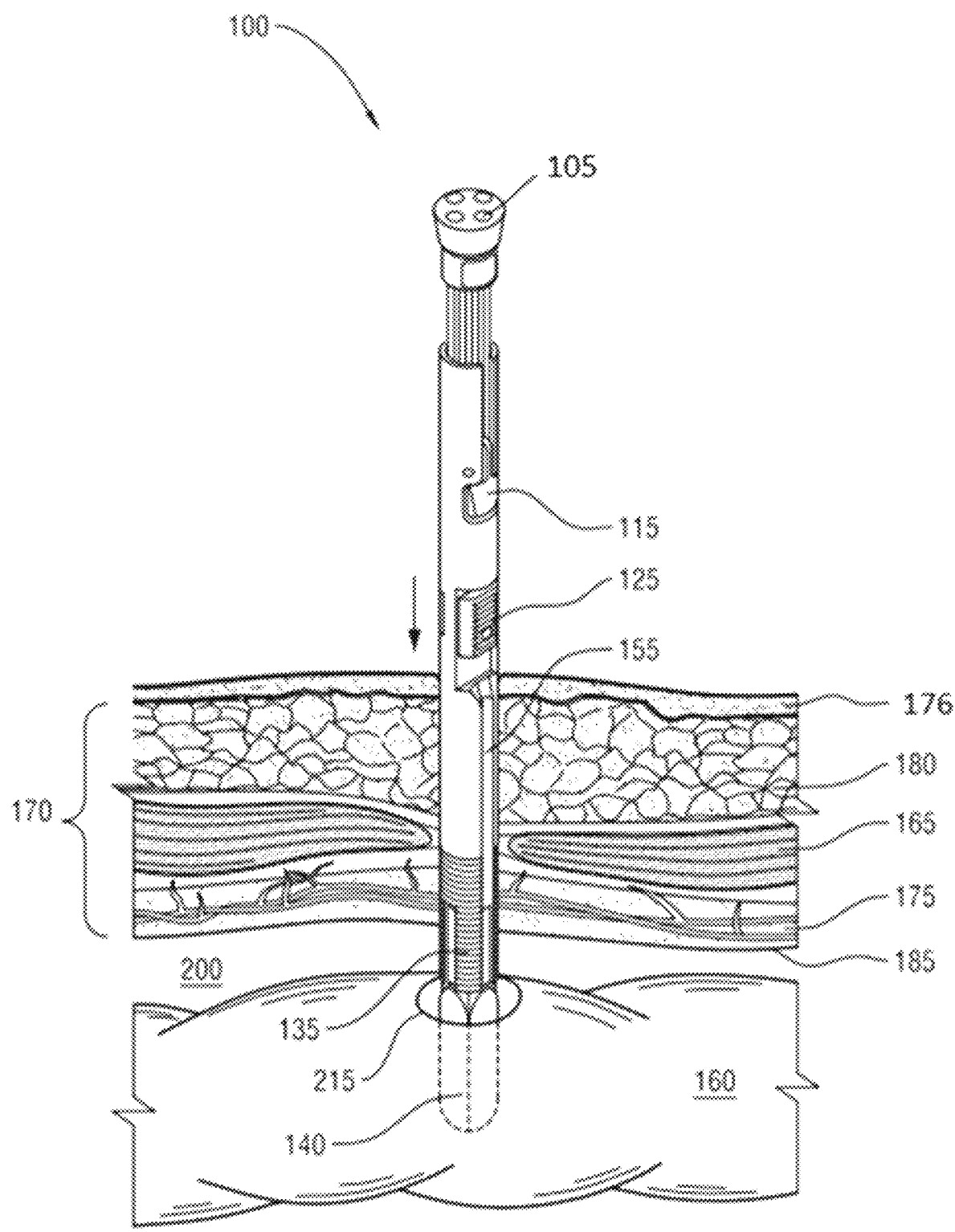
FIG. 4 is a schematic perspective view of an example multi-port closure device according to aspects and features of example devices discussed herein having a similar arrangement to the multi-port closure device of FIGS. 2C to 2E and FIGS. 3A to 3C, which schematically depicts initial movements for deployment of the example device inside an imperfection of the intestines for performing closure actions.

With respect to FIG. 4 the Multi-Port Closure Device (100) is illustrated going through the Fascia Area (170) into the Abdominal Cavity (200) and through an Imperfection (215) inside an Abdominal Organ (160).

Figure 5:
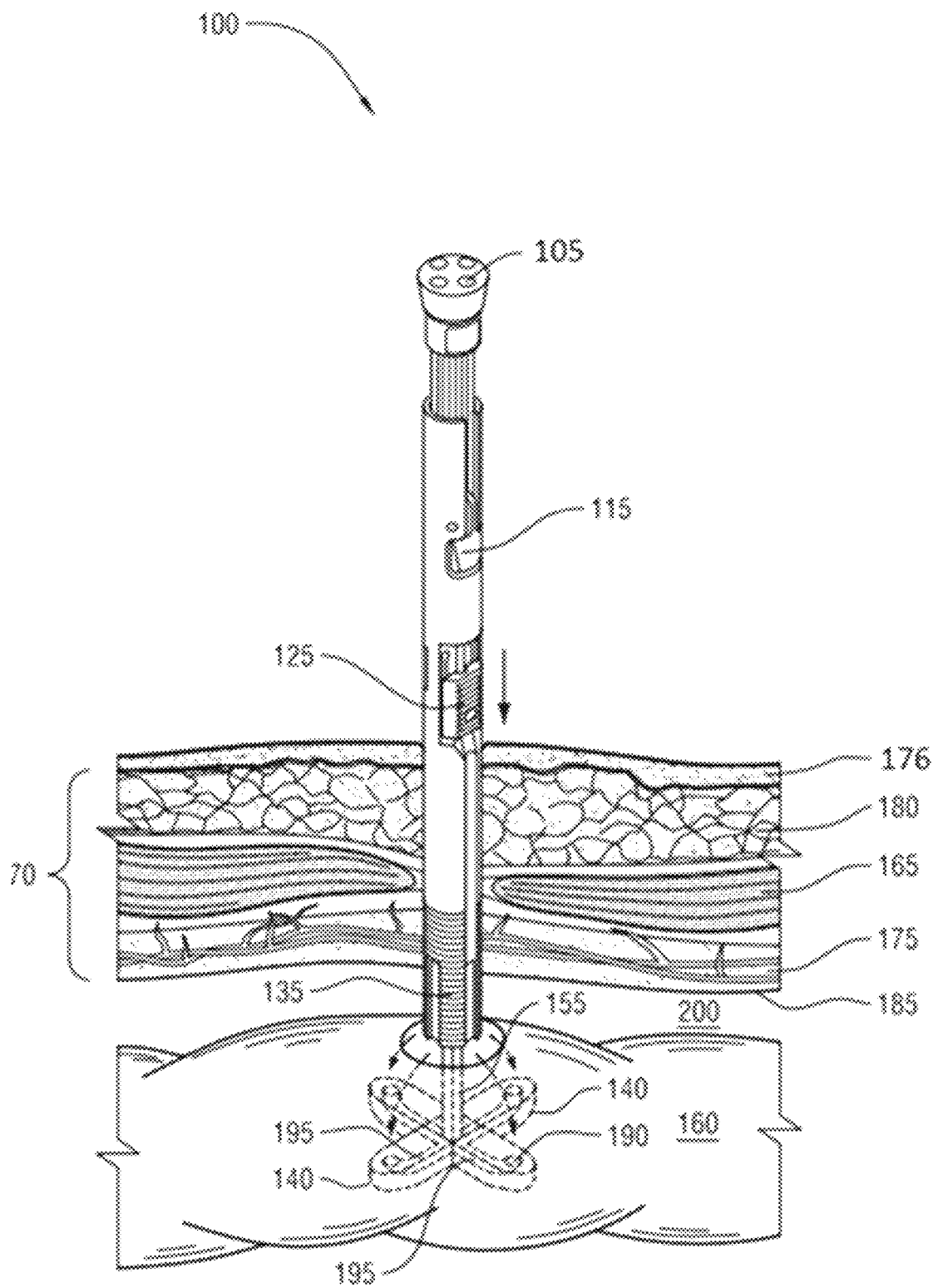
FIG. 5 is a schematic perspective view of the multi-port closure device of (FIG. 4 that illustrates example movements and actions corresponding with closure of a defect inside a body part including T-Bar opening actions as noted in FIG. 5.
Figure 6:
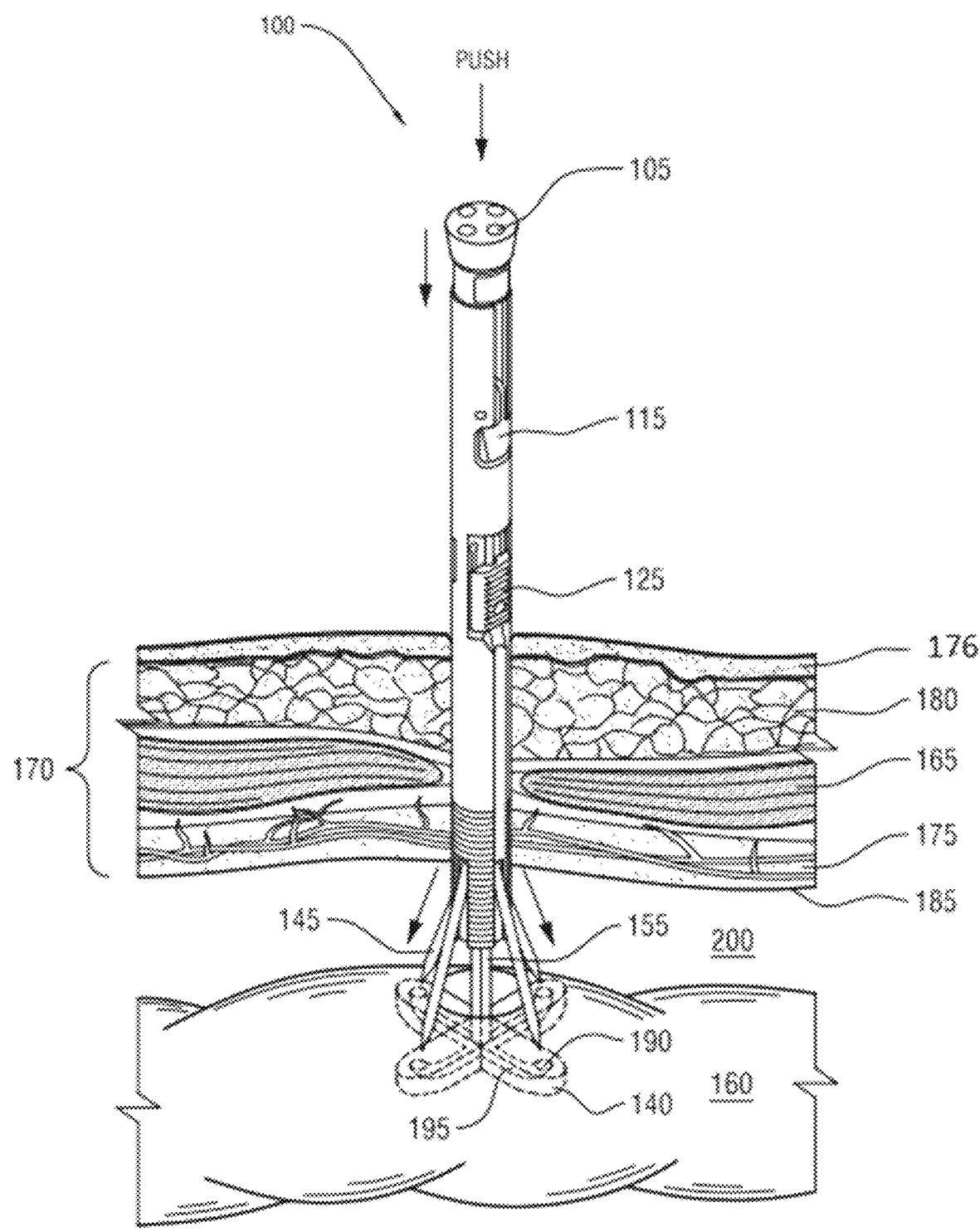
FIG. 6 is a schematic perspective view of the multi-port closure device of FIG. 5 that illustrates further example movements and actions corresponding with closure of the defect including actions for needles extending into position.

With respect to FIG. 5 the T-Bar is illustrated extended to the open position by the Multi-Port T-Bar Controller (155). From this position the stylets will be extended into the $2^{nd}$ imperfection. The T-bar is located under the $2^{nd}$ imperfection.

Figure 8:
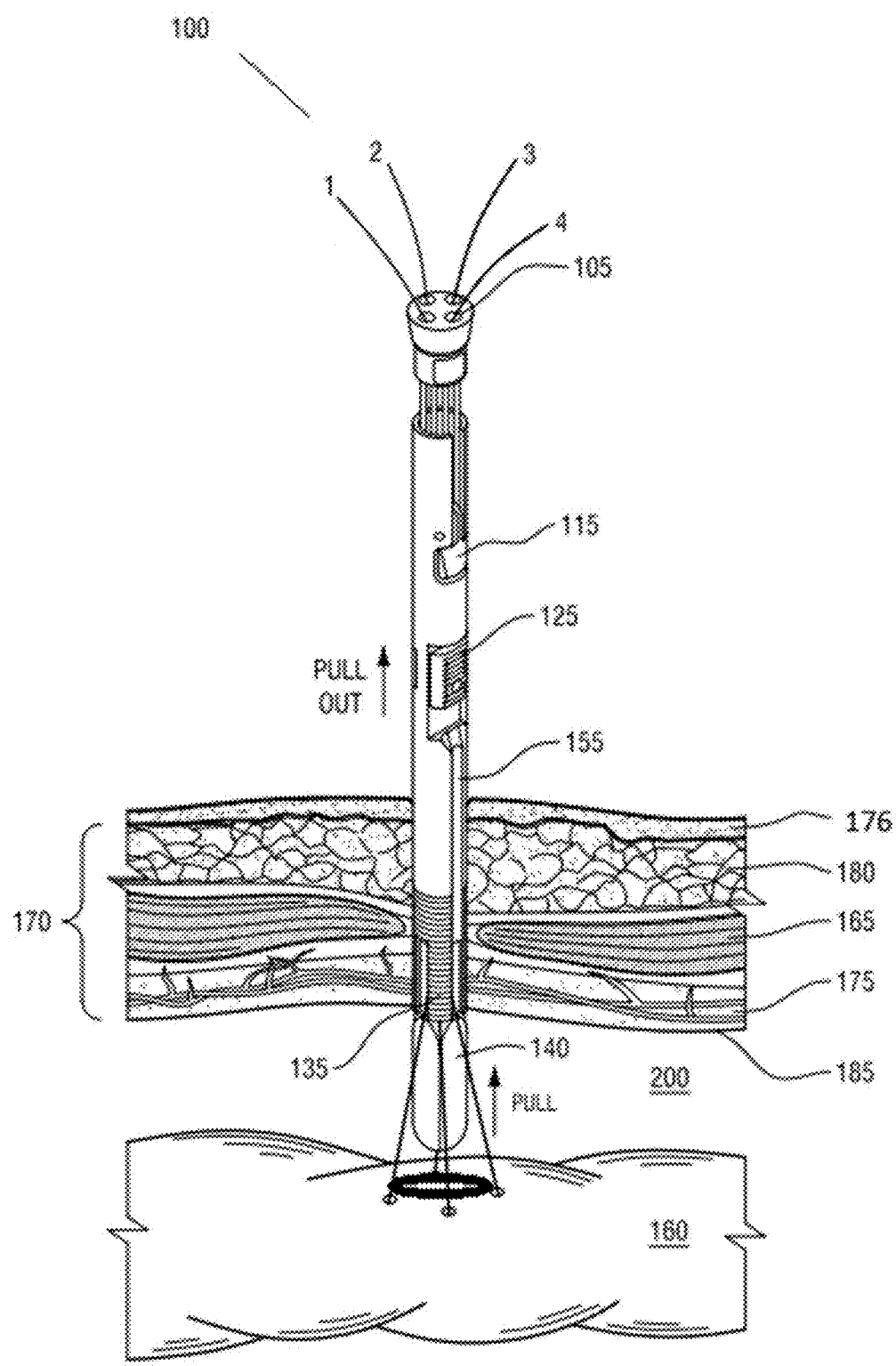
FIG. 8 is a schematic perspective view of the multi-port closure device of FIGS. 5 to 7 that illustrates further example movements and actions corresponding with closure of the defect including, actions for extracting the port closure device.

With respect to FIG. 8 the Stylets (110) begin the process of entering the Stylet Receptacle Area (190), completing the passage that the suture guide wire will take.

Figures 7A, 7B:
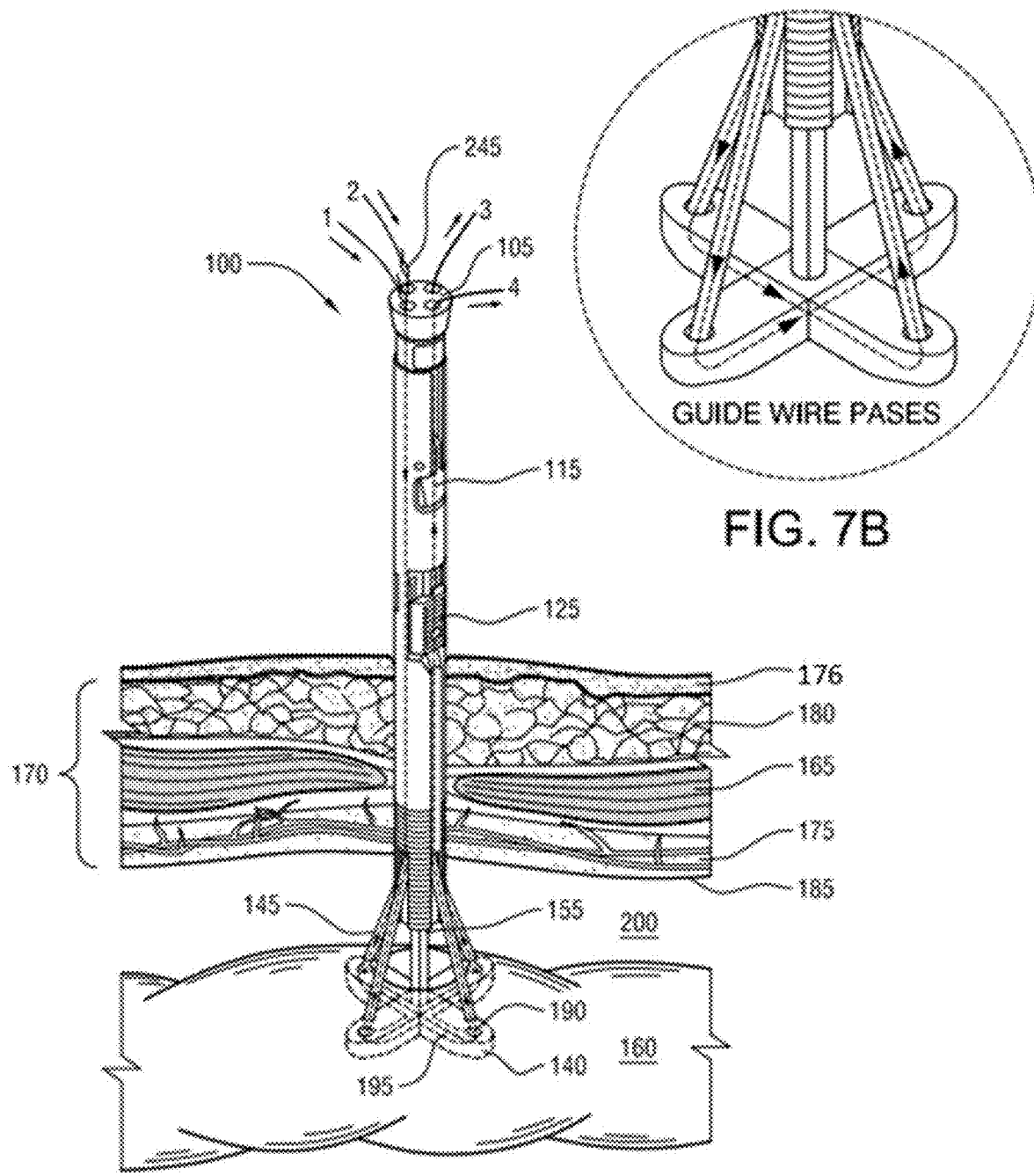
FIG. 7A is a schematic perspective view of the multi-port closure device of FIGS. 5 and 6 that illustrates further example movements and actions corresponding with closure of the defect including actions for inserting guide wire and suture wire.
FIG. 7B is a close perspective view of a distal end portion of the device of FIG. 7A.

With respect to FIG. 7A the Suture Guide Wire (245) is shown having fully deployed the Suture String (230) through the Multi-Port opening (105). In this position it is now safe to remove the Multi=Port Closure Device.

With respect to FIG. 713 illustrated is the Guide Wire Passage.

With respect to FIG. 8 illustrated is the Multi-Port Closure Device being extracted from the $2^{nd}$ imperfection.

Figure 9:
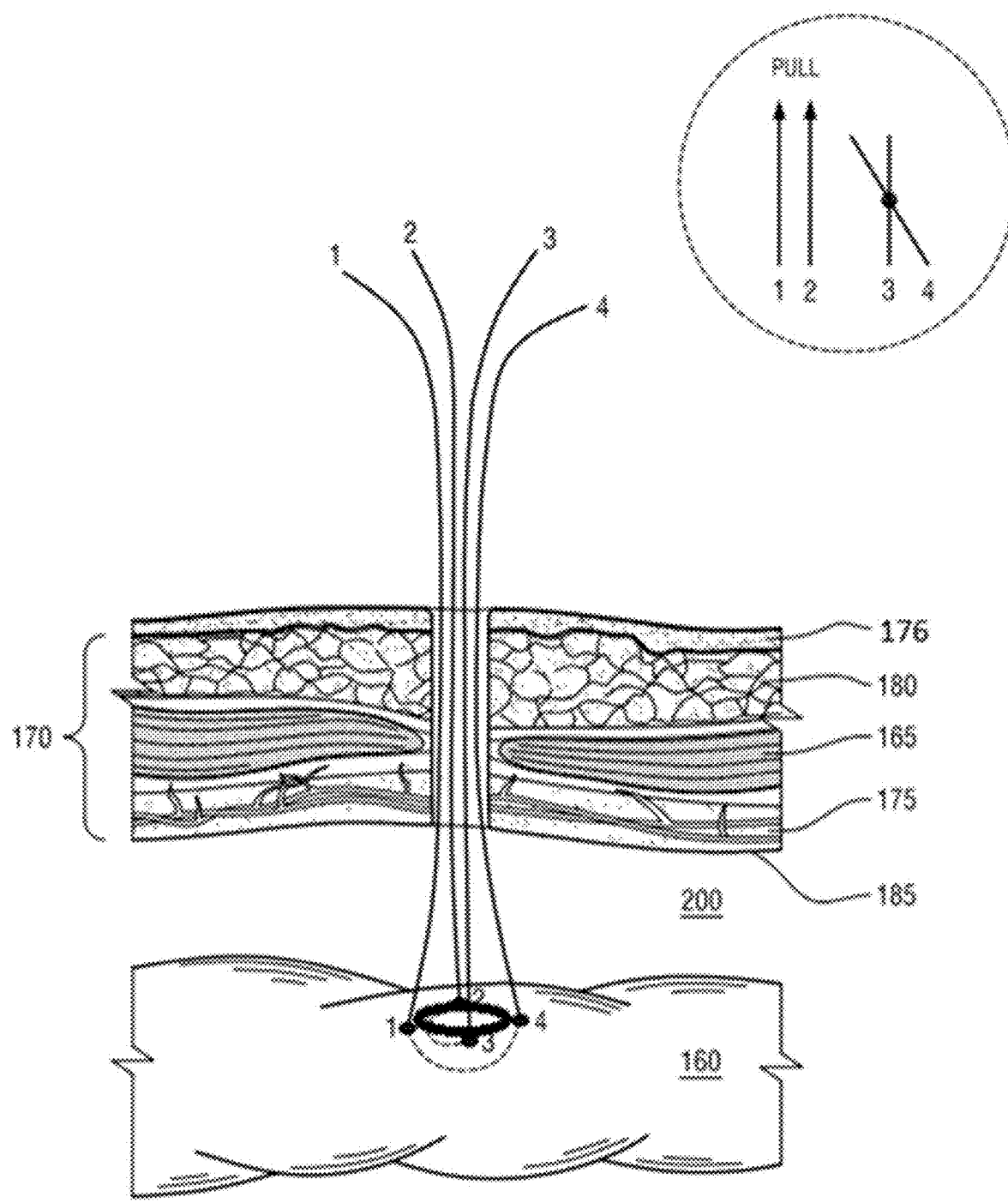
FIG. 9 is a schematic perspective view that depicts the arrangement of sutures of FIG. 8 after withdrawal of the multi-port closure device.

With respect to FIG. 9 illustrated is how the Suture String Ends 1-4 are located and how Suture Lines 3 & 4 are tied together to help form a figure eight knot.

With respect to FIG. 10A-10D the top view of the suturing knot is illustrated in the sequential order.

With respect to FIG. 10E-10H the bottom view of this process is illustrated showing how the knots are evenly pulled to produce a symmetric force closing the suture and $2^{nd}$ imperfection. This is the same process that will take place with the first imperfection.

Figure 11:
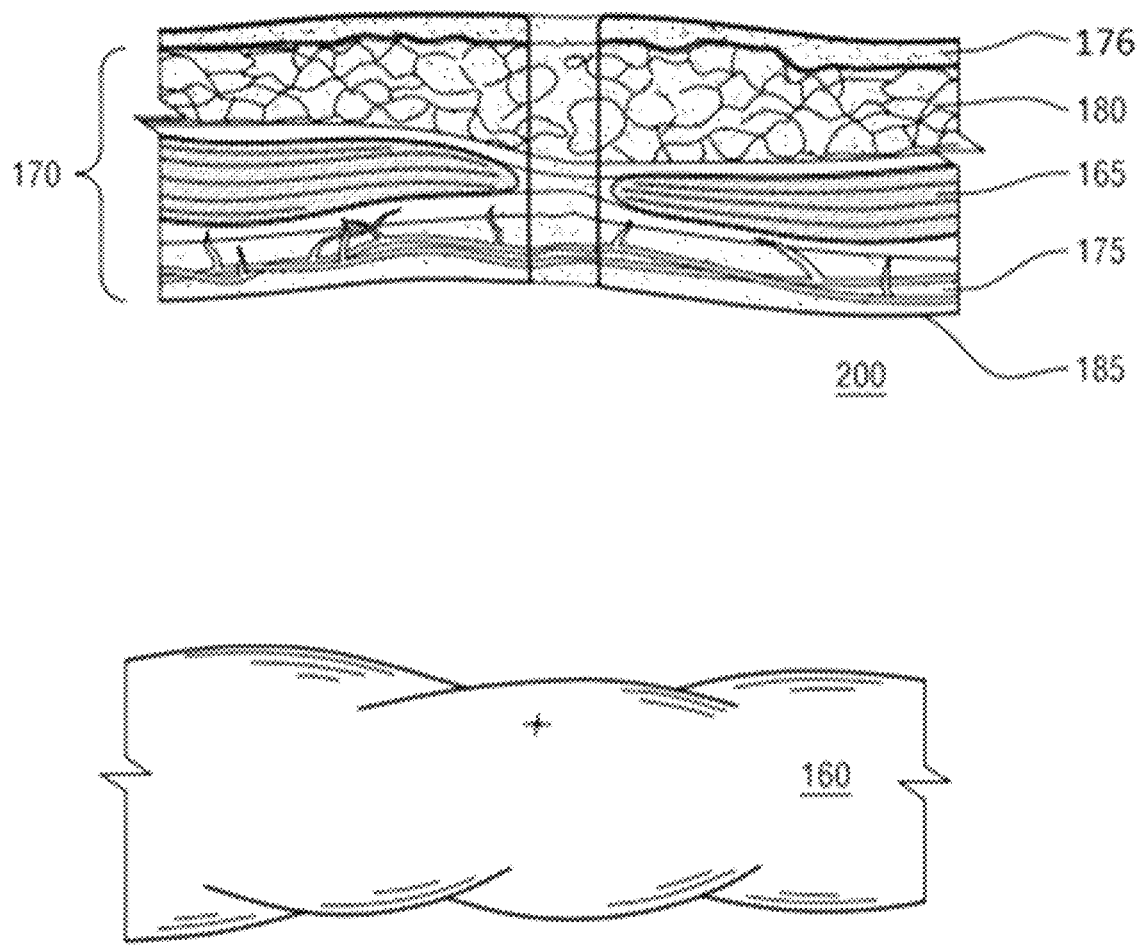
FIG. 11 schematically depicts a representation of a plan view of the intestine illustrated in FIGS. 4 to 9 shown with an internal defect closed as represented by scar.

With respect to FIG. 11, Illustrates the imperfection of the body organ it the knotted closed position.

Figure 12:
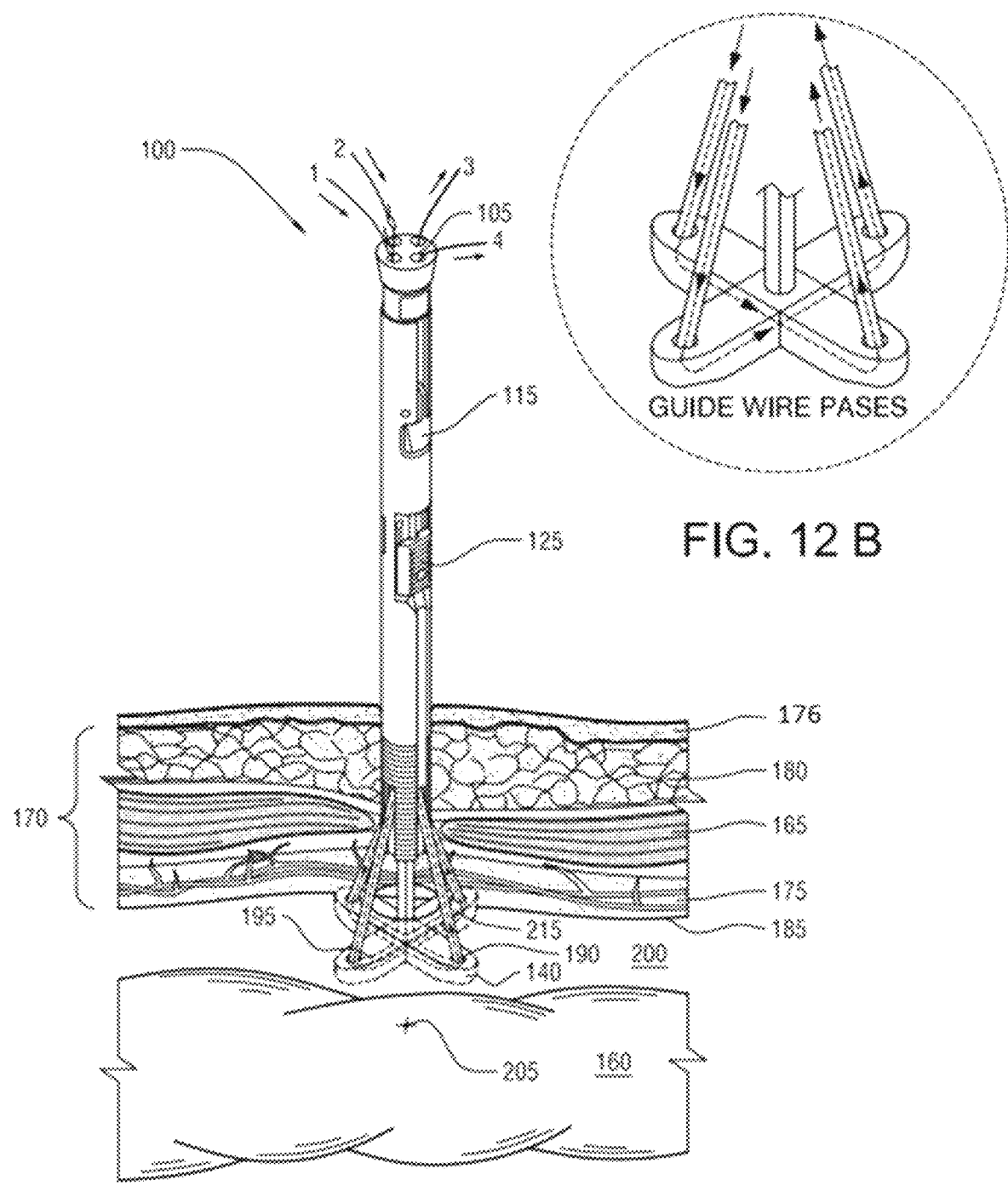
FIG. 12A is a perspective view of the multi-port suture device of FIGS. 4 to 11 performing actions in preparation for closing an imperfection located near the perineum as created for the surgical activities for completion of the surgery for closing the imperfection located near the perineum.
FIG. 12B is a close perspective view of the distal end of the multi-suture device showing the passageway of the suturing wire.

With respect to FIG. 12A the Multi-Port Closure Device (100) repeats the steps of FIG. 7A, FIG. 12B illustrated the Guide Wire Passages.

Figure 13:
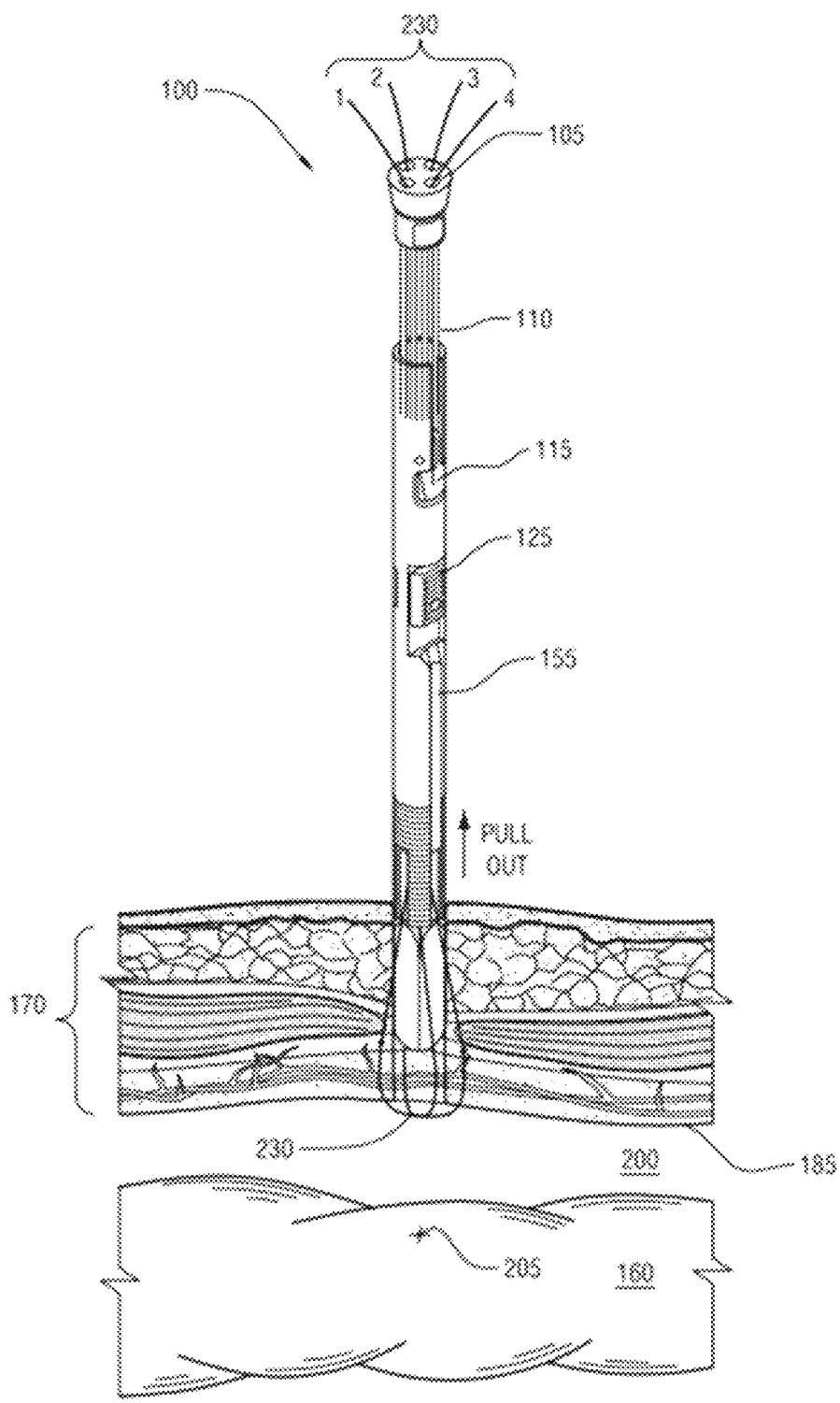
FIG. 13 is a perspective view of the multi-suture device being removed from the abdomen.

With respect to FIG. 13 illustrated are the corresponding steps of FIG. 8, here the Multi-Port Closure Device (100) is being extracted from the abdomen (200).

Figure 14A:
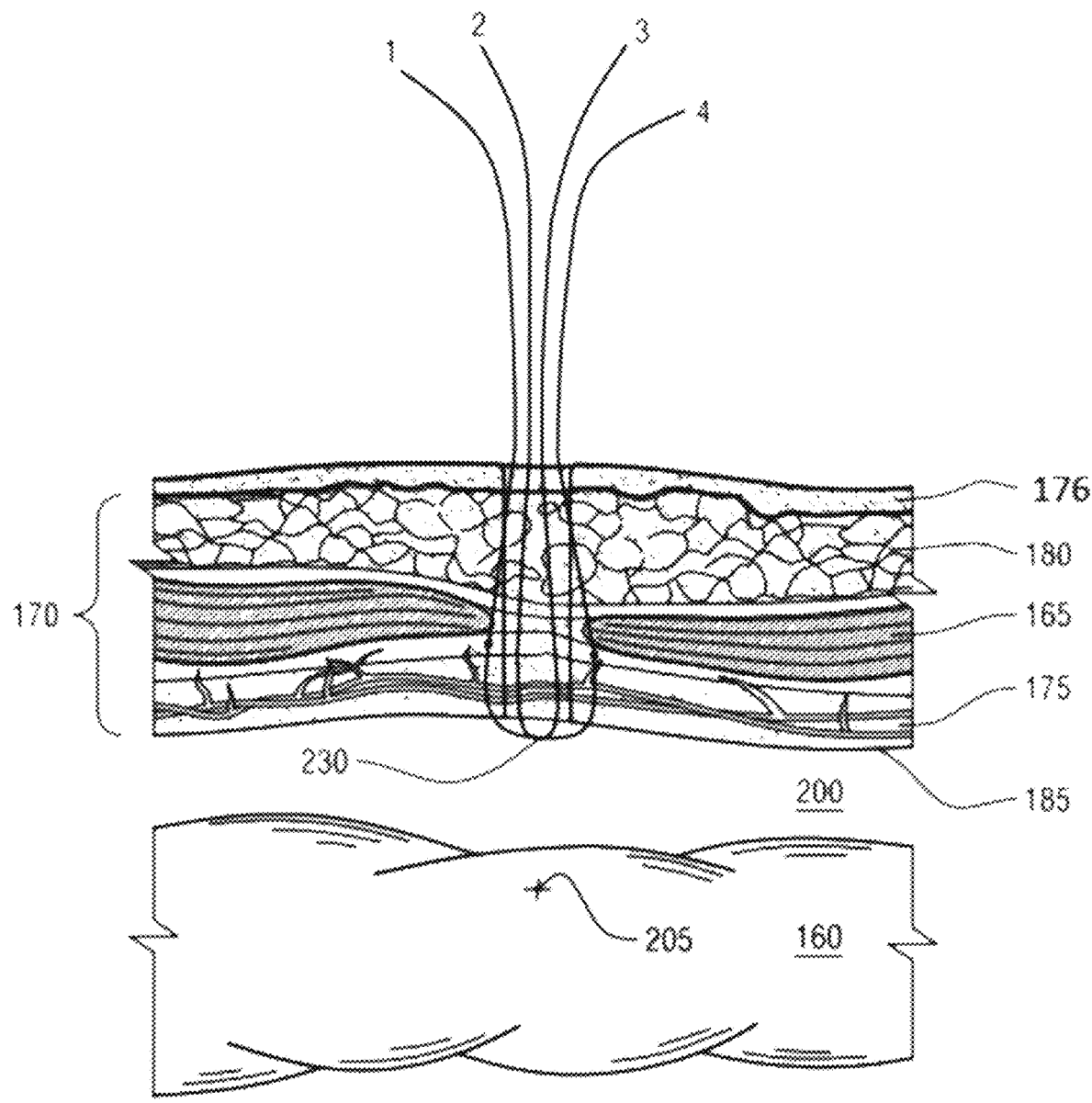
FIG. 14A schematically illustrates an example perspective view showing suture wires or thread simultaneously placed about a defect using the example multi-port closure device of FIGS. 4 to 13.
Figure 14B:
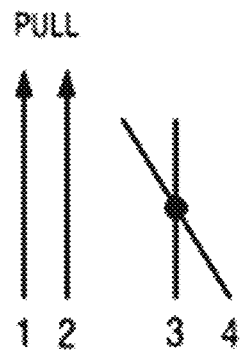
FIG. 14B illustrates a perspective view of the multi-port suture device showing an example multistrand wire or suture material configuration and depicting corresponding movements for creating the example FIGURE EIGHT know.

With respect to FIG. 14A illustrated is the orientation of the guide wires and 14B Illustrates the correct Knotting of wires 3 and 4 to form a circle 8 knot.

Figure 15:
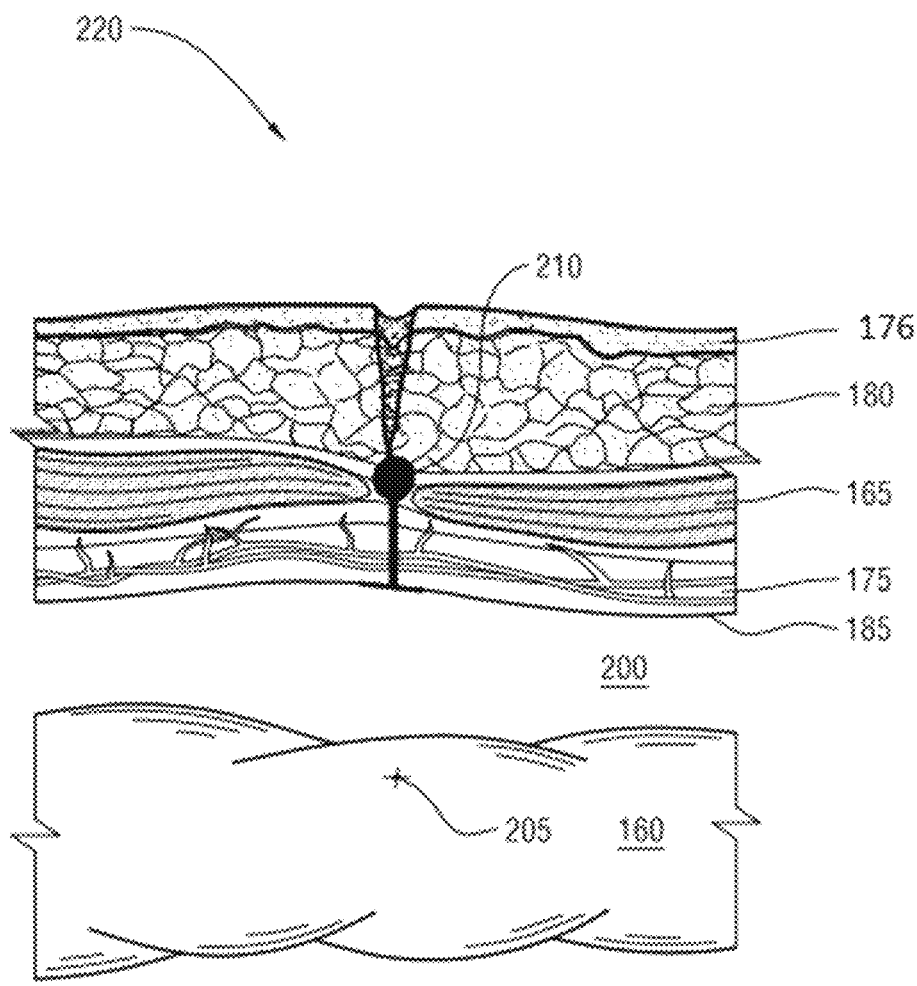
FIG. 15 schematically depicts a perspective view of double suture knots implemented using the example multi-port closure device of FIGS. 4 to 13 showing completed double suture knots.
Figure 16A:
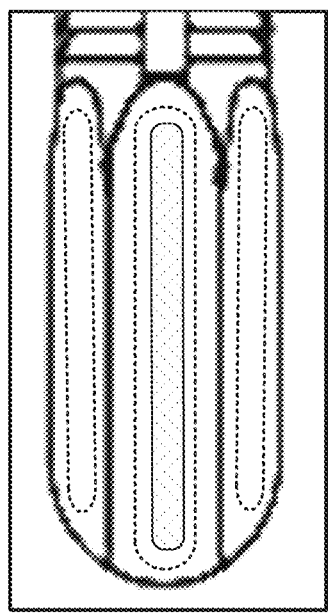
FIGS. 16A and 16B schematically show an example optional configuration of a cross-channel assembly for a multi-suture closure device in accordance with aspects and features described herein and showing a plan view of the assembly in the first arrangement in FIG. 16A and showing an example perspective view representation of the assembly moving to the second arrangement in FIG. 16B.
Figure 16B:
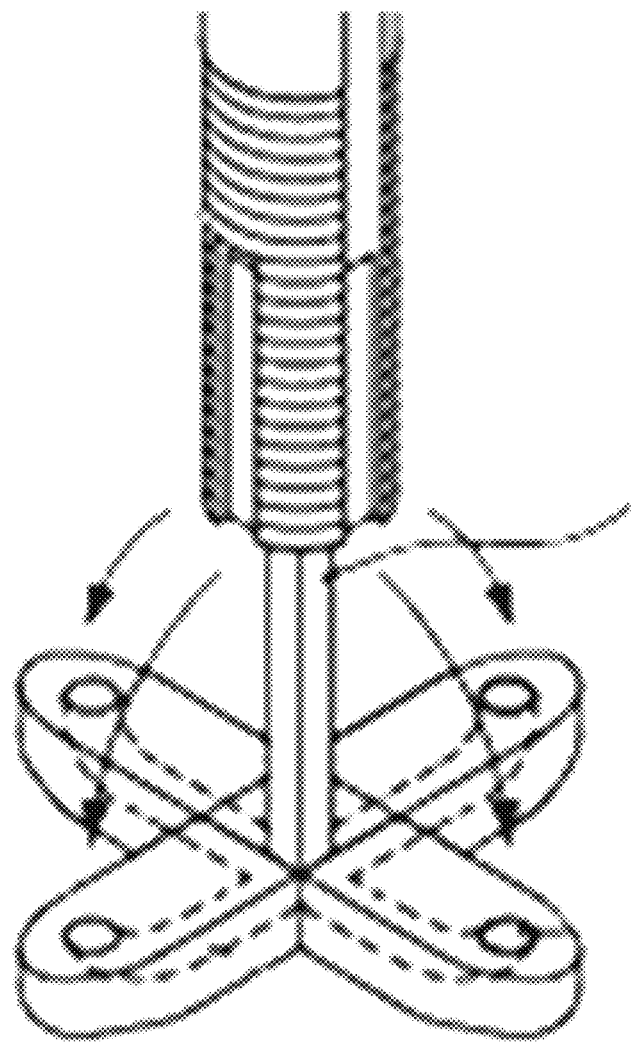
Figure 16C:
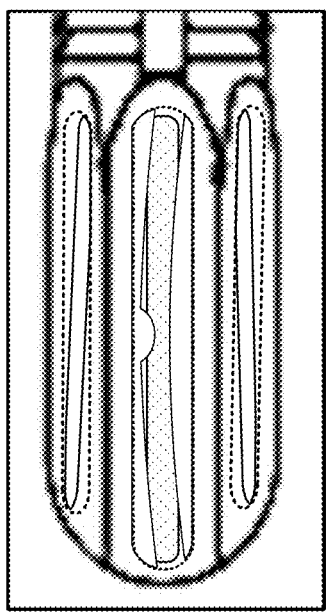
Figure 16D:
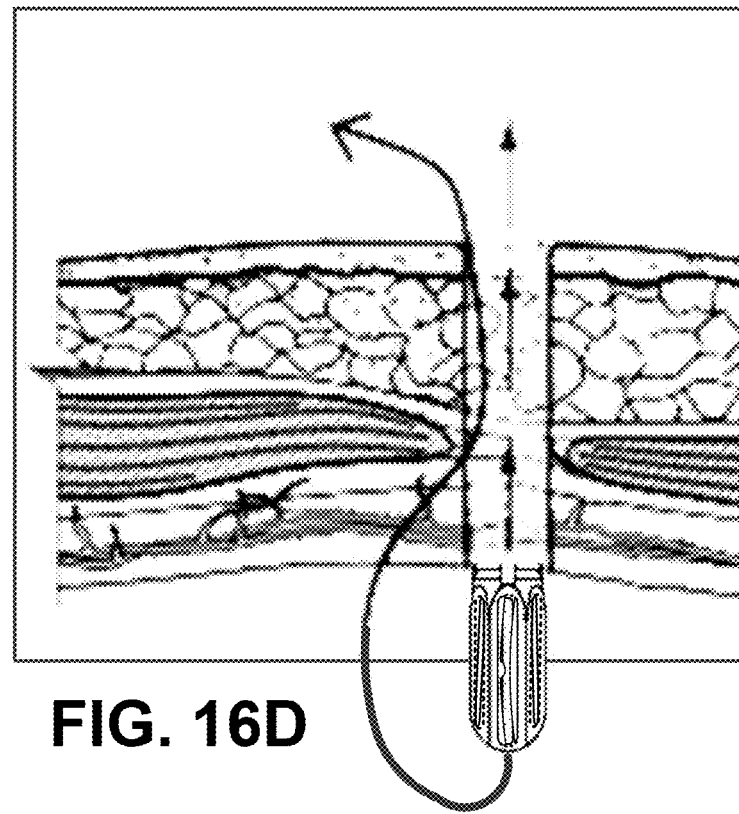
Figure 17:
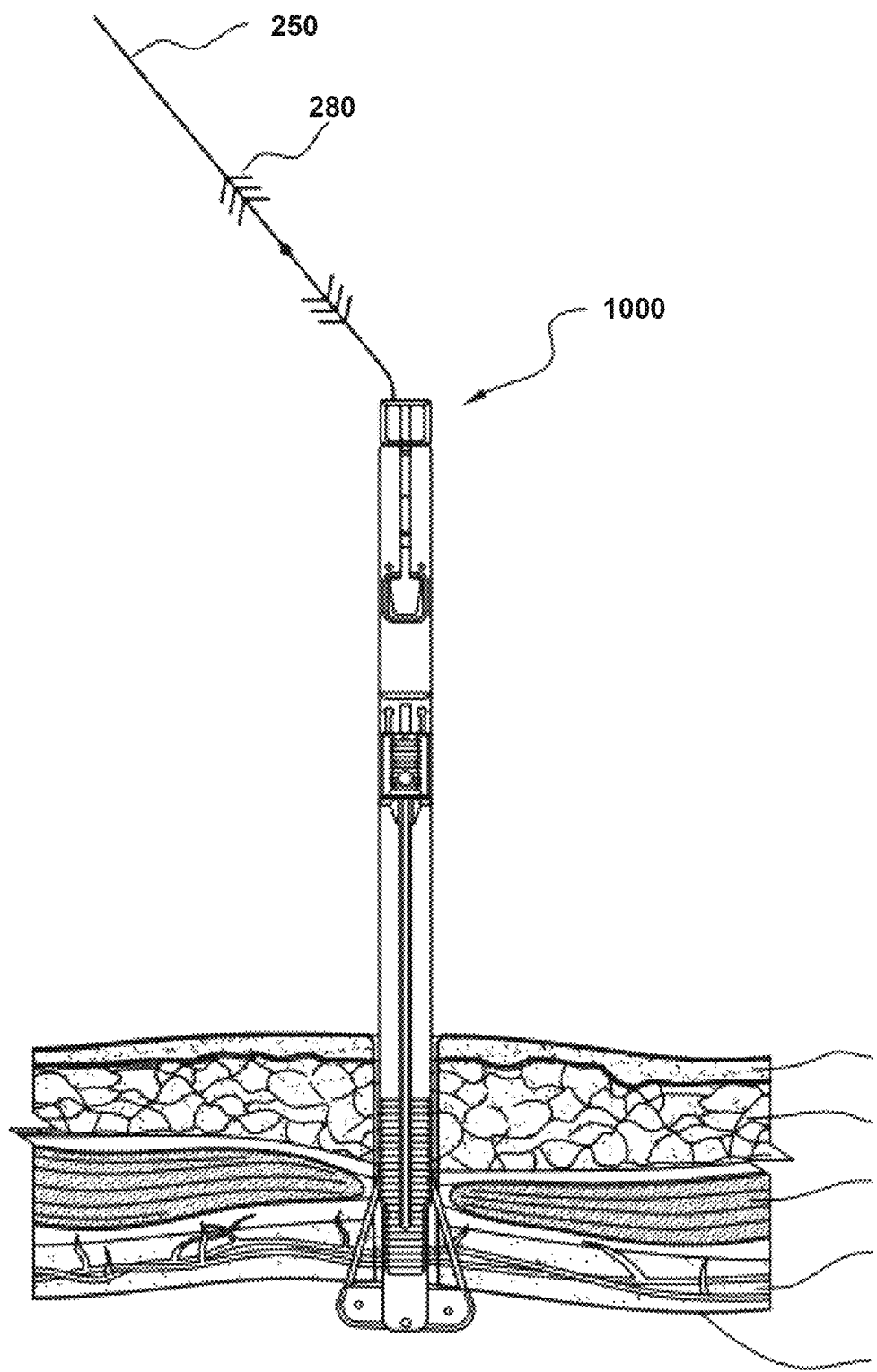
Figure 18A:
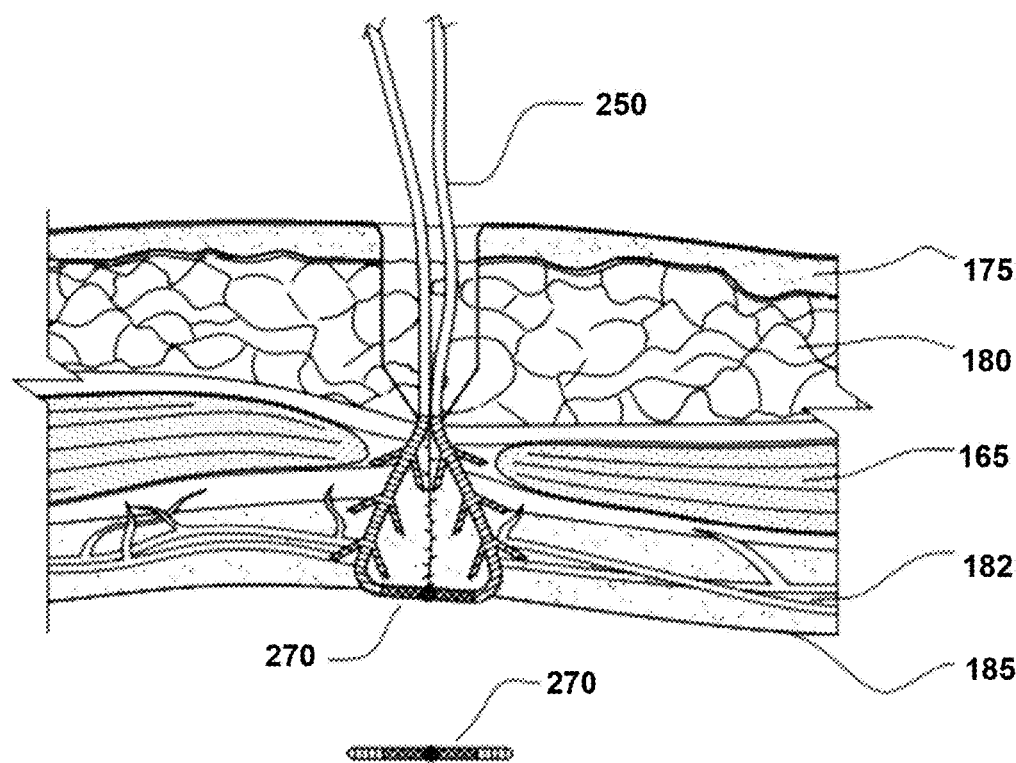
Figure 18B:
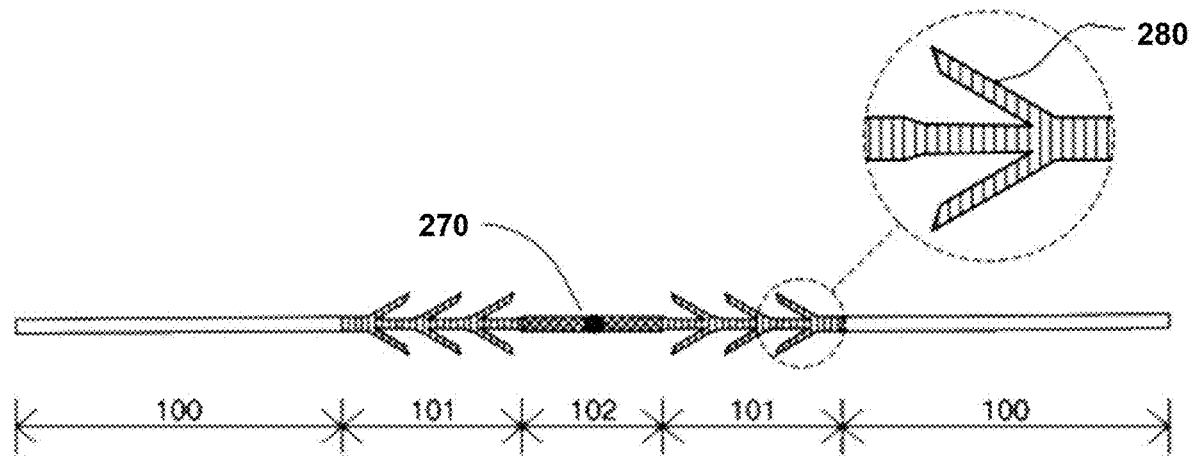
Figure 19A:
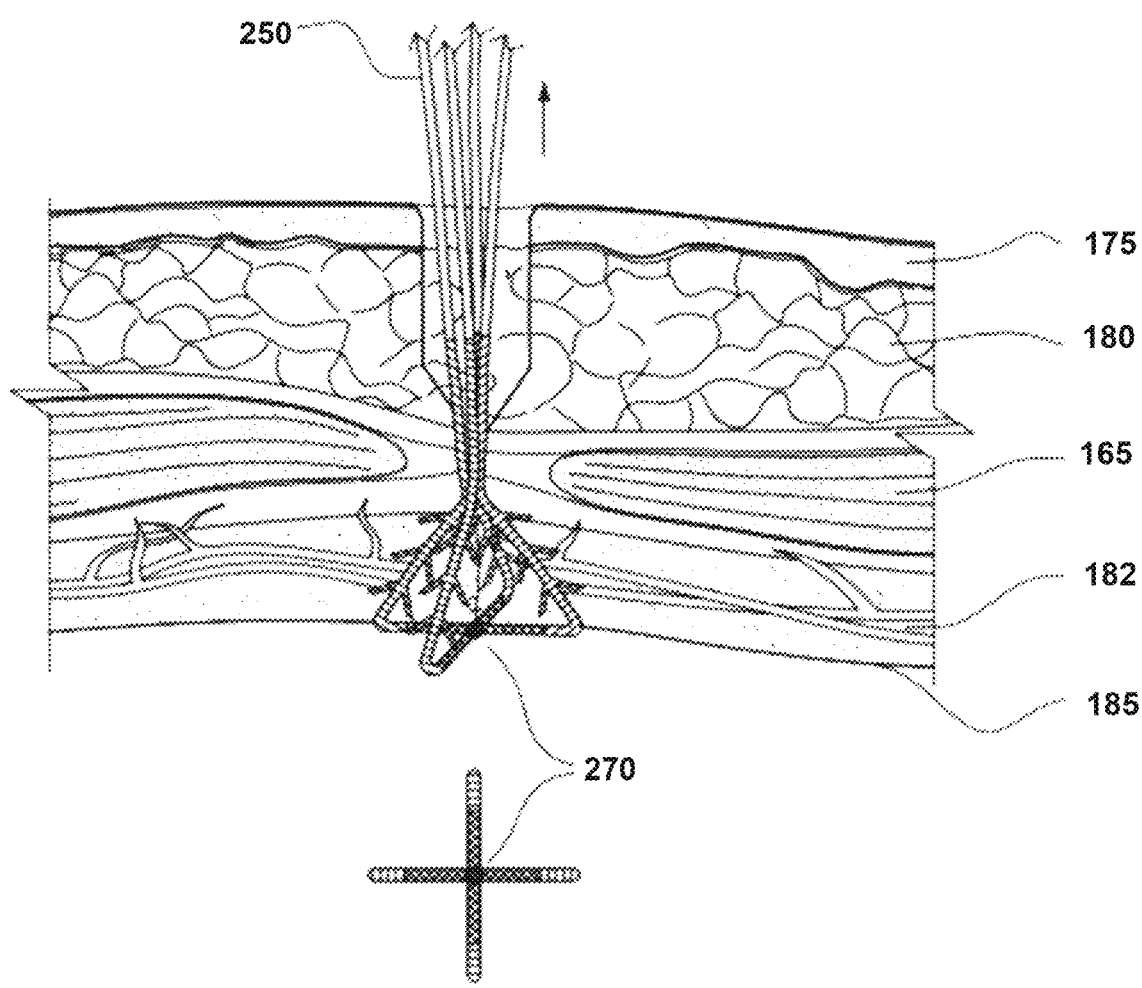
FIG. 19A schematically depicts an alternative arrangement including bi-directional double-barbed suture material combined with an example multi-port closure device according to aspects and features described herein.
Figure 19B:
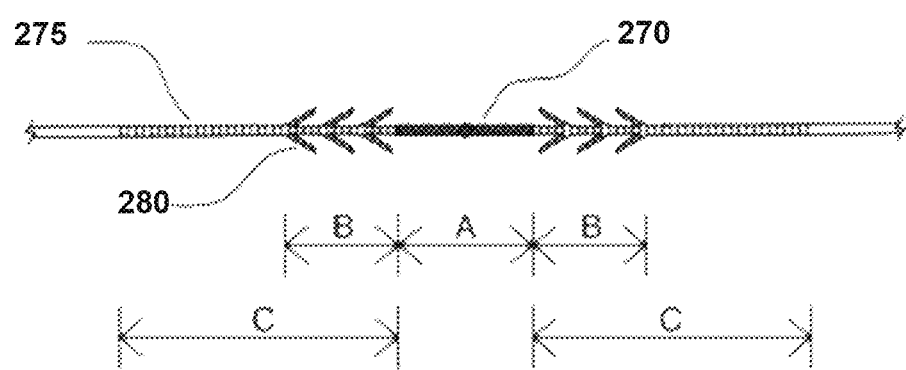
FIG. 19B provides a side view of the suture material illustrating geometric, dimensional, and/or visual features arranged for cooperative usage with a multi-port closure device.
Figure 20A:
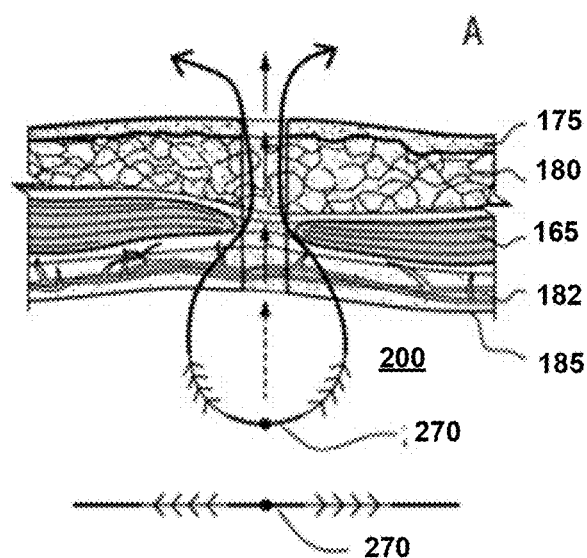
FIG. 20A illustrates a properly inserted Single Suture Barb.
Figure 20B:
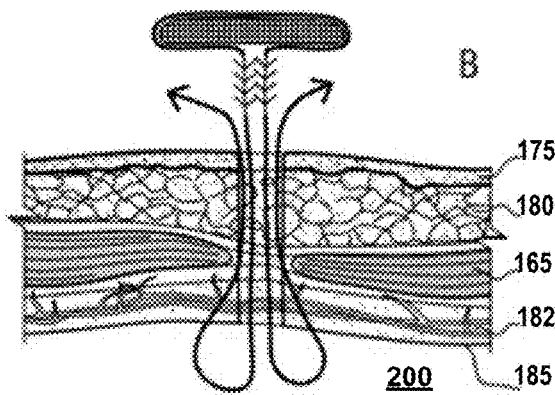
FIG. 20B schematically depicts a mesh being oriented for the pre-insertion position.
Figure 20C:
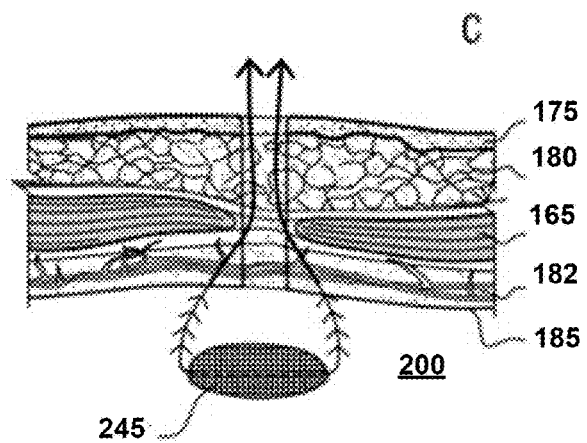
FIG. 20C schematically depicts the reinserted mesh properly positioned prior to pulling tight the single suture barb.
Figure 20D:
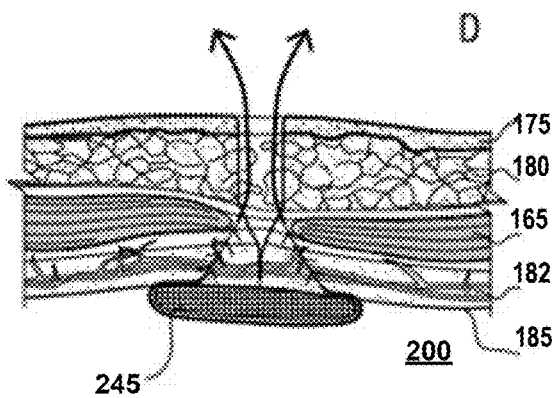
FIG. 20D schematically depicts the properly placed and secured mesh having a single suture barb.

With respect to FIG. 15 illustrated is the completed suture closure of dual imperfections (205) and (210).

While this invention has been described as having exemplary designs, the present invention may be further modified within the spirit and scope of the disclosure. This application is therefore intended to cover any variations, uses, or adaptations of the invention using its general principles. Further this application is intended to cover such departures from the present disclosure as come within known or customary practice in the an to which this invention pertains.

We claim:

1. A method of repairing and securely closing a fascial defect using a multi-port closure device, the method comprising:
   installing a first elongate suture material within a first predetermined suture pathway defining a first position disposed a radial distance from a center of the fascial defect located about a perimeter region of the fascial defect, and further defining a second position substantially opposite the first position disposed substantially the same radial distance from the center of the fascial defect located about the perimeter region, a first end portion of the first elongate suture material disposed at the first position and an opposite second end portion disposed at the second position, wherein a first orientation from the first end portion to the second end portion substantially bisects the center of the fascial defect;
   substantially simultaneously with the installing the first elongate suture material, installing a second elongate suture material within a second predetermined suture pathway, the second predetermined suture pathway defining a third position disposed substantially the same radial distance from the center of the fascial defect as the first and second positions located about the perimeter region of the fascial defect, and further defining a fourth position substantially opposite the third position disposed substantially the same radial distance from the center of the fascial defect about the perimeter region, a third end portion of the second elongate suture material disposed at the third position and an opposite fourth end portion of the second elongate suture material disposed at the fourth position, wherein a second orientation from the third end portion to the fourth end portion is substantially perpendicular to the first orientation and bisects the center of the fascial defect;
   closing the fascial defect including engaging the first elongate suture material concurrent with the second elongate suture material and simultaneously reducing spacing an equal amount between each of the first, second, third and fourth end portions with respect to the center of the fascial defect; and
   securing each of the first, second, third and fourth end portions about the center of the fascial defect at a bite position corresponding with each of the end portions;
   wherein each of the bite position is located equidistant from the fascial defect center at transverse orientations across the center of the fascial defect.

2. The method according to claim 1, wherein:
   the first elongate suture material includes a first bi-directional double suture material; the second elongate suture material includes a second bi-directional double suture material; installing the first elongate suture material within the first predetermined suture pathway with respect to the fascial defect includes initially engaging the perimeter region of the fascial defect at the first location with a first matching outboard barbed portion of the first elongate suture material and at the second location with a second matching outboard barbed portion of the first elongate suture material, each of the first and the second matching outboard barbed portions initially engaging the perimeter region at a corresponding first retention force and engagement distance;
   installing the second elongate suture material within the second predetermined suture pathway with respect to the fascial defect includes initially engaging the perimeter region of the fascial defect at the third location with a third matching outboard barbed portion of the second elongate suture material and at the fourth location with a fourth matching outboard barbed portion of the second elongate suture material, each of the third and the fourth matching outboard barbed portions initially engaging the perimeter region at a second corresponding retention force and a second engagement distance; and
   securing each of the first, second, third, and fourth end portions about the center includes simultaneously fully engaging the perimeter region of the fascial defect at a preset barbed engagement distance for each of the elongate suture material outboard barbed portions.

3. The method according to claim 1, further comprising:
   prior to performing the actions of closing the fascial defect including engaging the first elongate suture material concurrent with the second elongate suture material and simultaneously reducing spacing, and securing each of the first, second, third and fourth end portions about the center of the fascial defect:
      drawing a center portion of at least one of the first elongate suture material and the second elongate suture material through the fascial defect to an outboard location of a body with respect to the fascial defect;
      establishing a firm interface with at least a first mesh material; and
      withdrawing the center portion of the at least one of the first and second elongate suture material through the fascial defect, withdrawing the center portion including concurrently drawing the at least first mesh material through the fascial defect;
   the method further comprising:
   arranging at least one mesh engagement surface in a centered orientation facing the fascial defect at a location proximate the fascial defect; and
   securing the at least one mesh engagement surface in the centered orientation and the location proximate the fascial defect.

* * * * *